(12) United States Patent
Handshaw et al.

(10) Patent No.: US 11,847,525 B2
(45) Date of Patent: *Dec. 19, 2023

(54) BARCODE READER WITH TRANSFLECTIVE MIRROR

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US); Dariusz J. Madej, Shoreham, NY (US); Christopher W. Brock, Manorville, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,464

(22) Filed: Jan. 30, 2023

(65) Prior Publication Data
US 2023/0177292 A1      Jun. 8, 2023

Related U.S. Application Data

(63) Continuation of application No. 17/463,233, filed on Aug. 31, 2021, now Pat. No. 11,568,163.

(51) Int. Cl.
  *G06K 7/14* (2006.01)
  *G06K 7/10* (2006.01)

(52) U.S. Cl.
  CPC ....... *G06K 7/1413* (2013.01); *G06K 7/10831* (2013.01)

(58) Field of Classification Search
  CPC .................. G06K 7/1413; G06K 7/10831
  USPC ...................... 235/462.01–462.49
  See application file for complete search history.

(56) References Cited

U.S. PATENT DOCUMENTS

2010/0155485 A1*  6/2010  Tan ............... G06K 7/10702
                                             235/462.42

* cited by examiner

*Primary Examiner* — Jamara A Franklin
(74) *Attorney, Agent, or Firm* — Yuri Astvatsaturov

(57) ABSTRACT

Barcode readers with transflective mirrors are disclosed herein. An example barcode reader includes a housing and a window positioned within the housing, an imaging sensor and an illumination source positioned within the housing, and a transflective mirror positioned within the housing. The field-of-view of the imaging sensor is directed through the window along a first central axis of the field-of-view of the imaging sensor and the illumination pattern from the illumination source is directed through the window along a second central axis of the illumination pattern that is substantially parallel to the first central axis of the field-of-view of the imaging sensor.

23 Claims, 12 Drawing Sheets

BARCODE READER WITH TRANSFLECTIVE MIRROR

CROSS-REFERENCE TO RELATED APPLICATION

This application is a continuation of U.S. patent application Ser. No. 17/463,233, filed on Aug. 31, 2021, and incorporated herein by reference in its entirety.

BACKGROUND

Typical barcode readers, such as handheld barcode readers and direct part marking scanners, that have an image sensor and an illumination source that are directed out of a common window require that the image sensor and illumination source are aligned with different lines of sight, which creates parallax, or a displacement or difference in an apparent position of a pattern produced by the illumination source along the two different lines of sight. In addition, in typical barcode readers, it requires multiple illumination sources to provide illumination in different directions. It would be beneficial if barcode readers having an image sensor and an illumination source could direct the fields-of-view of the image sensor and illumination source out of a common window coaxially along a common central axis to avoid parallax. In addition, it would be beneficial to be able to direct illumination out of a common window in different directions without having to use multiple illumination sources.

SUMMARY

In an embodiment, the present invention is a barcode reader comprising a housing and a window positioned in the housing, an imaging sensor and an illumination source positioned within the housing, and a first transflective mirror positioned within the housing. A field-of-view of the imaging sensor is directed through the window along a first central axis of the field-of-view of the imaging sensor and an illumination pattern from the illumination source is directed through the window along a second central axis of the illumination pattern that is substantially parallel to the central axis of the field-of-view of the imaging sensor. The first transflective mirror is positioned in a path of at least one of the field-of-view of the imaging sensor or the illumination pattern from the illumination source.

In a variation of this embodiment, the second central axis of the illumination pattern is coaxial with the first central axis of the field-of-view of the imaging sensor.

In another variation of this embodiment, the first transflective mirror is positioned in a path of the field-of-view of the imaging sensor. The field-of-view of the imaging sensor passes through the first transflective mirror and out the window with the first transflective mirror in a transmissive state and the illumination pattern from the illumination source is reflected off of the first transflective mirror and out the window with the first transflective mirror in a reflective state.

In another variation of this embodiment, a second transflective mirror is positioned within the housing and in the path of the illumination pattern of the illumination source and an imaging axis of the imaging sensor is aligned parallel to an illumination axis of the illumination source. The illumination pattern from the illumination source is reflected off of the second transflective mirror and towards the first transflective mirror with the second transflective mirror in the reflective state and the illumination pattern from the illumination source passes through the second transflective mirror and out the window with the transflective mirror in a transmissive state.

In another variation of this embodiment, the first transflective mirror is positioned in a path of the illumination pattern from the illumination source. The illumination pattern from the illumination source passes through the first transflective mirror and out the window with the first transflective mirror in a transmissive state and the field-of-view of the imaging sensor is reflected off of the first transflective mirror and out the window with the first transflective mirror in a reflective state.

In another embodiment, the present invention is a barcode reader comprising a housing and a window positioned within the housing, an imaging sensor and an illumination source positioned within the housing, and a transflective mirror positioned within the housing and in a path of an illumination pattern from the illumination source. The illumination pattern from the illumination source passes through the transflective mirror with the transflective mirror in a transmissive state and the illumination pattern from the illumination source is reflected off of the transflective mirror with the transflective mirror in a reflective state.

In a variation of this embodiment, a mirror is positioned within the housing and an imaging axis of the imaging sensor is aligned parallel to an illumination axis of the illumination source. The illumination pattern from the illumination source passes through the transflective mirror and out the window along a second central axis of the illumination pattern that is parallel to a first central axis of a field-of-view of the imaging sensor with the transflective mirror in a transmissive state and the illumination pattern from the illumination source is reflected off of the transflective mirror towards the mirror and is reflected off of the mirror and out the window along a third central axis of the illumination pattern that is parallel or non-parallel to the first central axis of the field-of-view of the imaging sensor with the transflective mirror in a reflective state.

In another variation of this embodiment, a mirror is positioned within the housing and an imaging axis of the imaging sensor is aligned perpendicular to an illumination axis of the illumination source. The illumination pattern from the illumination source passes through the transflective mirror and is reflected off of the mirror and out the window along a third central axis of the illumination pattern that is parallel or non-parallel to a first central axis of a field-of-view of the imaging sensor with the transflective mirror in a transmissive state and the illumination pattern from the illumination source is reflected off of the transflective mirror and out the window along a second central axis of the illumination pattern that is parallel to the first central axis of the field-of-view of the imaging sensor with the transflective mirror in a reflective state.

In another variation of this embodiment, a diffuser is positioned within the housing and an imaging axis of the imaging sensor is aligned parallel to an illumination axis of the illumination source. The illumination pattern from the illumination source passes through the transflective mirror and out the window along a second central axis of the illumination pattern that is parallel to a first central axis of a field-of-view of the imaging sensor with the transflective mirror in a transmissive state and the illumination pattern from the illumination source is reflected off of the transflective mirror towards the diffuser and through the diffuser and out the window with the transflective mirror in a reflective state.

In another variation of this embodiment, a diffuser is positioned within the housing and an imaging axis of the imaging sensor is aligned perpendicular to an illumination axis of the illumination source. The illumination pattern from the illumination source passes through the transflective mirror and through the diffuser and out the window with the transflective mirror in a transmissive state and the illumination pattern from the illumination source is reflected off of the transflective mirror and out the window along a second central axis of the illumination pattern that is parallel to a first central axis of a field-of-view of the imaging sensor with the transflective mirror in a reflective state.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
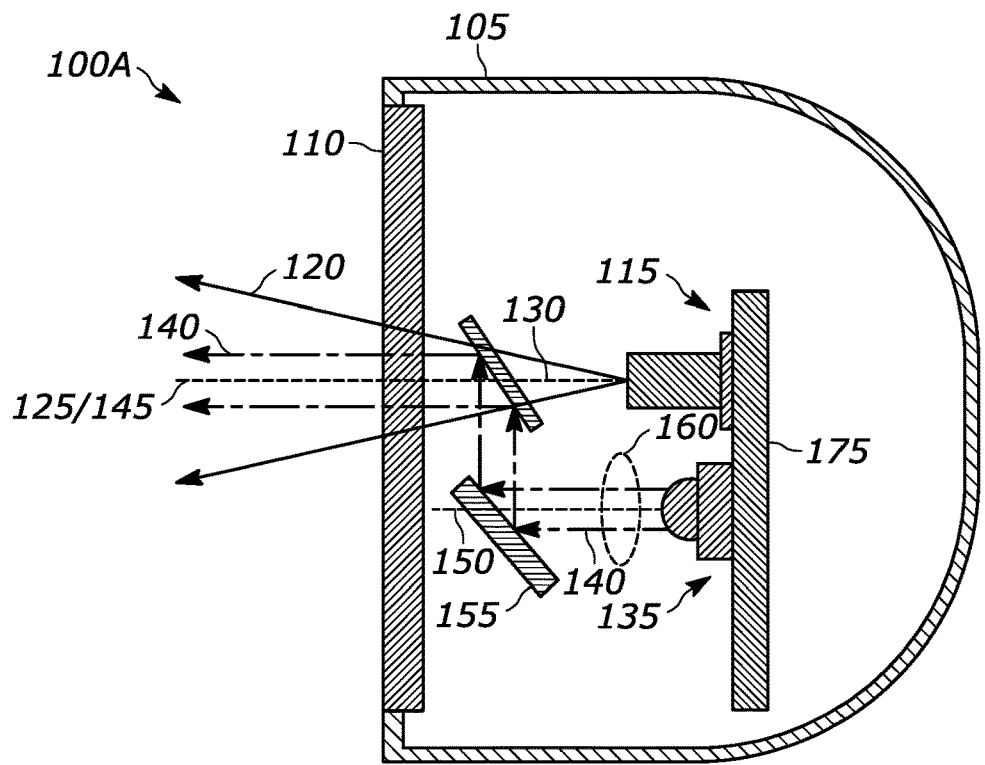
FIG. 1 illustrates a side cross-sectional schematic view of a first example barcode reader having a transflective mirror.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Referring to FIGS. 1-7, example barcode readers 100A-G are shown that use a transflective mirror to direct a field-of-view of an imaging sensor and an illumination pattern from an illumination source out a window along central axes that are substantially parallel, and preferably coaxial. With the field-of-view of the imaging sensor coaxial with the illumination pattern of the illumination source, there would be zero parallax, which would ensure that the illumination pattern is always centered on the field-of-view of the imaging sensor no matter what distance from the barcode scanner, ensures that the illumination pattern will not 'walk' across the field-of-view of the imaging sensor along different distances due to parallax, makes it easier for the user to aim with, and eliminates the need for calibration. In this configuration, the imaging sensor also doesn't need to see the aimer because it would never shift with respect to the center pixel of the imaging sensor.

In the examples shown, barcode readers 100A-G include a housing 105 with a window 110 positioned within housing 105, imaging sensor 115 and illumination source 135 positioned within housing 105, and a first transflective mirror 155, such as the e-TransFlector™ from Kent Optronics, positioned within housing 105. Imaging sensor 115 can include a cylinder and/or a lens system to assist in directing a field-of-view 120 of imaging sensor 115, if desired. Unless specified in a particular example, illumination source 135 can be an illumination assembly or an aiming assembly. Aiming assemblies typically provide some very defined illumination pattern to help a user visualize some portion of a field-of-view and illumination assemblies help to deliver sufficient light into the direction of the field-of-view to sufficiently illuminate a target that is within that field-of-view for image capture (similar to a flash on a camera). These systems are normally independent. Aiming assemblies and illumination assemblies are also generally activated at different times. This is because a broad illumination of a field-of-view through an illumination assembly (especially one that has diffuse light) will do little to identify the defined features of a field-of-view. For instance, due to the scattered nature of diffuse light, such light cannot provide a defined feature like an image of a dot, which could reference a center of a field-of-view or an image of a line that could reference a boundary of a field-of-view. In addition, a broad illumination of a field-of-view can impede the ability to clearly identify an aim light pattern by overpowering the light emitted by the aiming assembly with the light emitted by the illumination assembly. Conversely, a defined aim pattern visible during image capture when the target is being illuminated can interfere with the content of the image data, particularly when the target is a barcode. A visible aim mark positioned over a barcode and captured in an image can interfere with the ability to accurately read that barcode. First transflective mirror 155 can be switched between a transmissive state, in which a majority of light is allowed to pass through first transflective mirror 155, and a reflective state, in which a majority of light is reflected off of first transflective mirror 155. In these examples, field-of-view 120 of imaging sensor 115 is directed through window 110 along a first central axis 125 of field-of-view 120 of imaging sensor 115 and an illumination pattern 140 from illumination source 135 is directed through window 110 along a second central axis 145 of illumination pattern 140 that is substantially parallel to, and preferably coaxial with, first central axis 125 of field-of-view 120 of imaging sensor 115. As used herein, substantially parallel means within +/−5 degrees of parallel.

Referring specifically to FIGS. 1-5, in barcode readers 100A, 100B, 100C, 100D, and 100E, first transflective mirror 155 is positioned in a path of field-of-view 120 of imaging sensor 115. With first transflective mirror 155 in a transmissive state, field-of-view 120 of imaging sensor 115 passes through first transflective mirror 155 and out window 110 and illumination pattern 140 from illumination source 135 passes through first transflective mirror 155 and is not directed out of window 110. With first transflective mirror 155 in the reflective state, illumination pattern 140 from illumination source 135 is reflected off of first transflective mirror 155 and out window 110 and field-of-view 120 is reflected off of first transflective mirror 155 and is not directed out of window 110. Optionally, first transflective mirror 155 could also be switched to a transflective state, in which first transflective mirror 155 is partially reflective and partially transmissive, and first transflective mirror 155 would both allow field-of-view 120 of imaging sensor 115 to pass through first transflective mirror 155 and out of window 110 and illumination pattern 140 from illumination source 135 to be reflected off of transflective mirror and out of window 110, which could be used for calibration or picklist.

In one possible configuration, the switching of first transflective mirror 155 between the reflective and transmissive states can be synchronized with the frame rate of imaging sensor 115 such that first transflective mirror 155 changes states between the reflective and transmissive states between each image capture of imaging sensor 115. Therefore, with an imaging sensor having a frame rate of 120 frames-per-second, there would still be 60 frames-per-second captured by imaging sensor when first transflective mirror 155 is in the transmissive state. Alternatively, first transflective mirror 155 can be switched between the transmissive and reflective states at any rate and time desired. For example, in a second possible configuration, the switching of first transflective mirror 155 between the reflective and transmissive states can be synchronized with the frame rate of imaging sensor 115 such that first transflective mirror 155 alternates and changes state between the reflective and transmissive states after two image captures of imaging sensor 115 and then changes back between the reflective and transmissive states after one image capture of imaging sensor 115.

Figure 3:
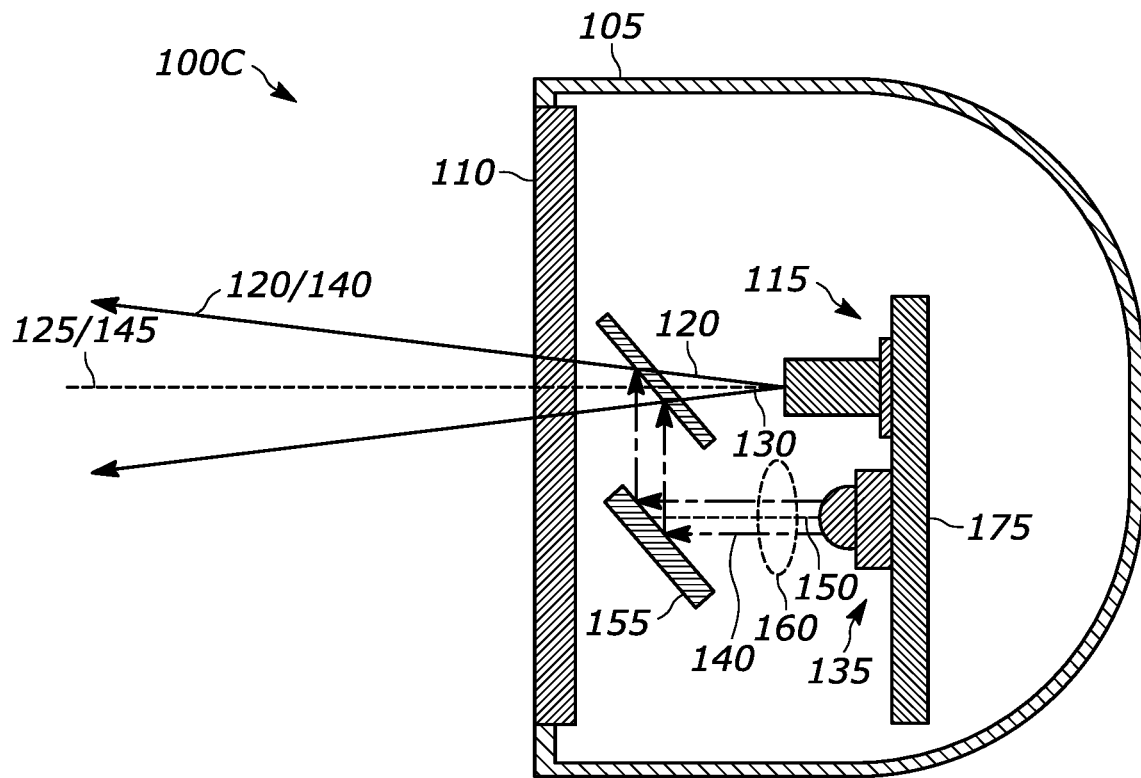
FIG. 3 illustrates a side cross-sectional schematic view of the example barcode reader of FIG. 1 with the illumination pattern from the illumination source the same size as the field-of-view of the imaging sensor.
Figure 8A:
FIGS. 8A-F illustrate various illumination patterns with the barcode readers herein.
Figure 8B:
Figure 8C:
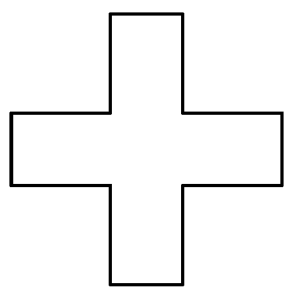
Figure 8D:
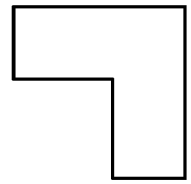
Figure 8D:
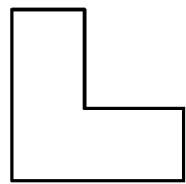
Figure 8E:
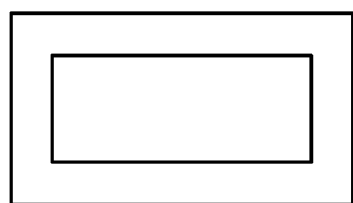
Figure 8F:
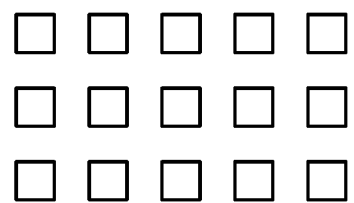

As shown in FIGS. 1 and 3, in barcode readers 100A and 100C, a mirror 165 can be positioned within housing 105 in the path of illumination pattern 140 from illumination source 135 to reflect illumination pattern 140 towards first transflective mirror 155. In these examples, an imaging axis 130 of imaging sensor 115 is aligned parallel to an illumination axis 150 of illumination source 135 and illumination pattern 140 is reflected off of mirror 165 towards first transflective mirror 155 and off of first transflective mirror 155 and out of window 110 with first transflective mirror 155 in the reflective state. With imaging axis 130 of imaging sensor 115 aligned parallel to an illumination axis 150 of illumination source 135, imaging sensor 115 and illumination source 135 could both be mounted to a common printed circuit board 175. An optical element 160, such as a lens, a polarizer, a filter, an aperture, a diffractive optical element, a refractive optical element, etc., could also be positioned in the path of illumination pattern 140 from illumination source 135 between illumination source 135 and first transflective mirror 155 to focus or collimate illumination pattern 140 from illumination source 135 or to create a specific pattern. For example, illumination pattern 140 can be focused so that illumination pattern 140 that passes through window 110 produces a specified pattern within field-of-view 120 of imaging sensor 115 (FIG. 1) or illumination pattern 140 can be focused so that illumination pattern 140 that passes through window 110 is the same size as field-of-view 120 of imaging sensor 115 that passes through window 110 (FIG. 3). In either configuration, illumination pattern 140 can be focused to be any pattern, such as an aiming dot (FIG. 8A), a line (FIG. 8B), a cross pattern (FIG. 8C) that could match the edges of field-of-view 120 of imaging sensor 115, a rectangle (FIG. 8E) that could match the edges of field-of-view 120 of imaging sensor 115, one or more corner brackets (FIG. 8D) that could match the edges of field-of-view 120 of imaging sensor 115, a changing structured light pattern (FIG. 8F), etc. A changing structured light pattern can be projected directly over field-of-view 120 of imaging sensor 115 with zero parallax and could be used to communicate various things to a user, such as: (1) displaying a warning for an expired item as indicated by the barcode; (2) a notice that a security check is required for a restricted or high security item (e.g., tobacco, alcohol, firearms, etc.); (3) a pattern that are associated with specific items; and/or (4) an overlay of expected adjacent symbols or elements that should be near the barcode to aid in the identification of ticket switching.

Figure 2:
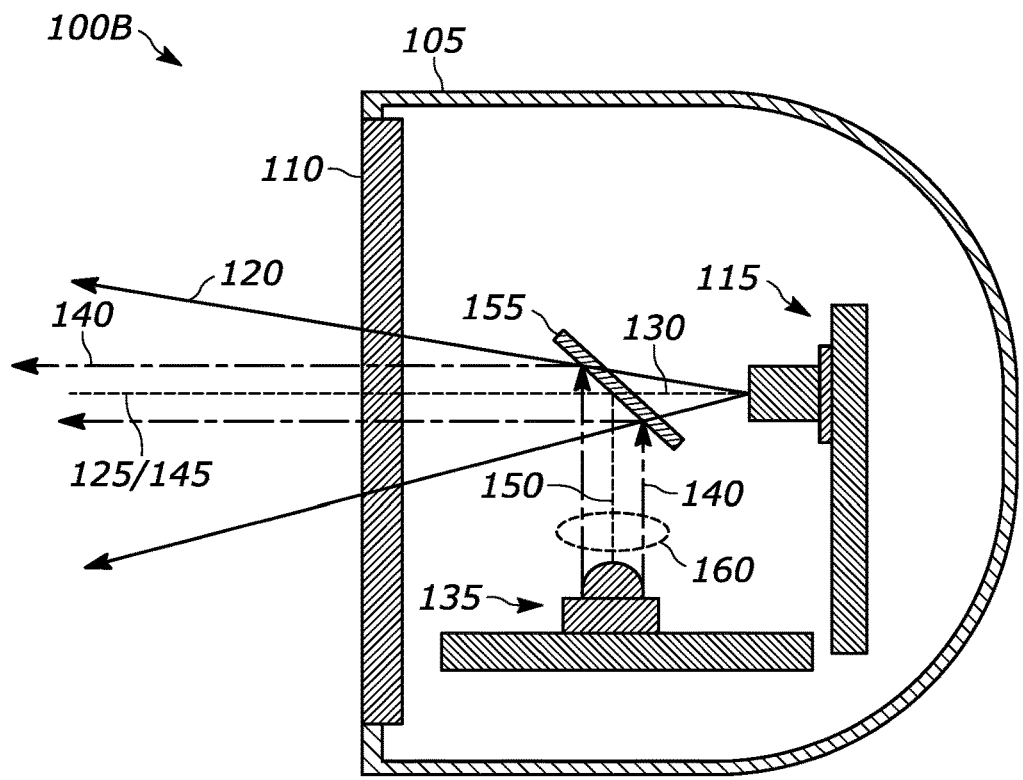
FIG. 2 illustrates a side cross-sectional schematic view of a second example barcode reader having a transflective mirror.
Figure 4:
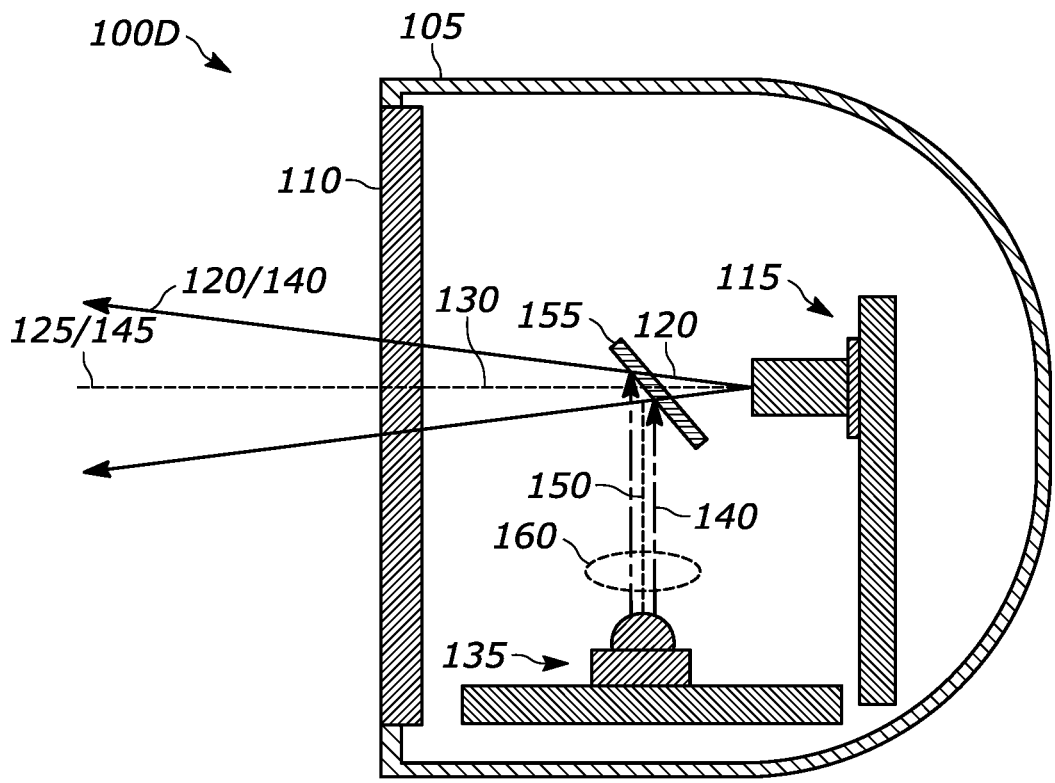
FIG. 4 illustrates a side cross-sectional schematic view of the example barcode reader of FIG. 2 with the illumination pattern from the illumination source the same size as the field-of-view of the imaging sensor.

Conversely, as shown in FIGS. 2 and 4, in barcode readers 100B and 100D, imaging axis 130 of imaging sensor 115 could be aligned perpendicular to illumination axis 150 of illumination source 135 and first transflective mirror 155 could be positioned directly in the path of field-of-view 120 of imaging sensor 115 and directly in a path of illumination pattern 140 from illumination source 135. In these examples, an additional mirror is not required to direct illumination pattern 140 from illumination source 135 towards first transflective mirror 155, however, imaging sensor 115 and illumination source 135 would most likely be mounted to two separate printed circuit boards within housing 105. Optical element 160 could also be positioned in the path of illumination pattern 140 from illumination source 135 between illumination source 135 and first transflective mirror 155 to focus or collimate illumination pattern 140 from illumination source 135 or to create a specific pattern. For example, illumination pattern 140 can be focused so that illumination pattern 140 that passes through window 110 produces a specified pattern within field-of-view 120 of imaging sensor 115 (FIG. 2) or illumination pattern 140 can be focused so that illumination pattern 140 that passes through window 110 is the same size as field-of-view 120 of imaging sensor 115 that passes through window 110 (FIG. 4). In either configuration, illumination pattern 140 can be focused to be any pattern, such as an aiming dot (FIG. 8A), a line (FIG. 8B), a cross pattern (FIG. 8C) that could match the edges of field-of-view 120 of imaging sensor 115, a rectangle (FIG. 8E) that could match the edges of field-of-view 120 of imaging sensor 115, one or more corner brackets (FIG. 8D) that could match the edges of field-of-view 120 of imaging sensor 115, a changing structured light pattern (FIG. 8F), etc. A changing structured light pattern can be projected directly over field-of-view 120 of imaging sensor 115 with zero parallax and could be used to communicate various things to a user, such as: (1) displaying a warning for an expired item as indicated by the barcode; (2) a notice that a security check is required for a restricted or high security item (e.g., tobacco, alcohol, firearms, etc.); (3) a pattern that are associated with specific items; and/or (4) an overlay of expected adjacent symbols or elements that should be near the barcode to aid in the identification of ticket switching.

Figure 5:
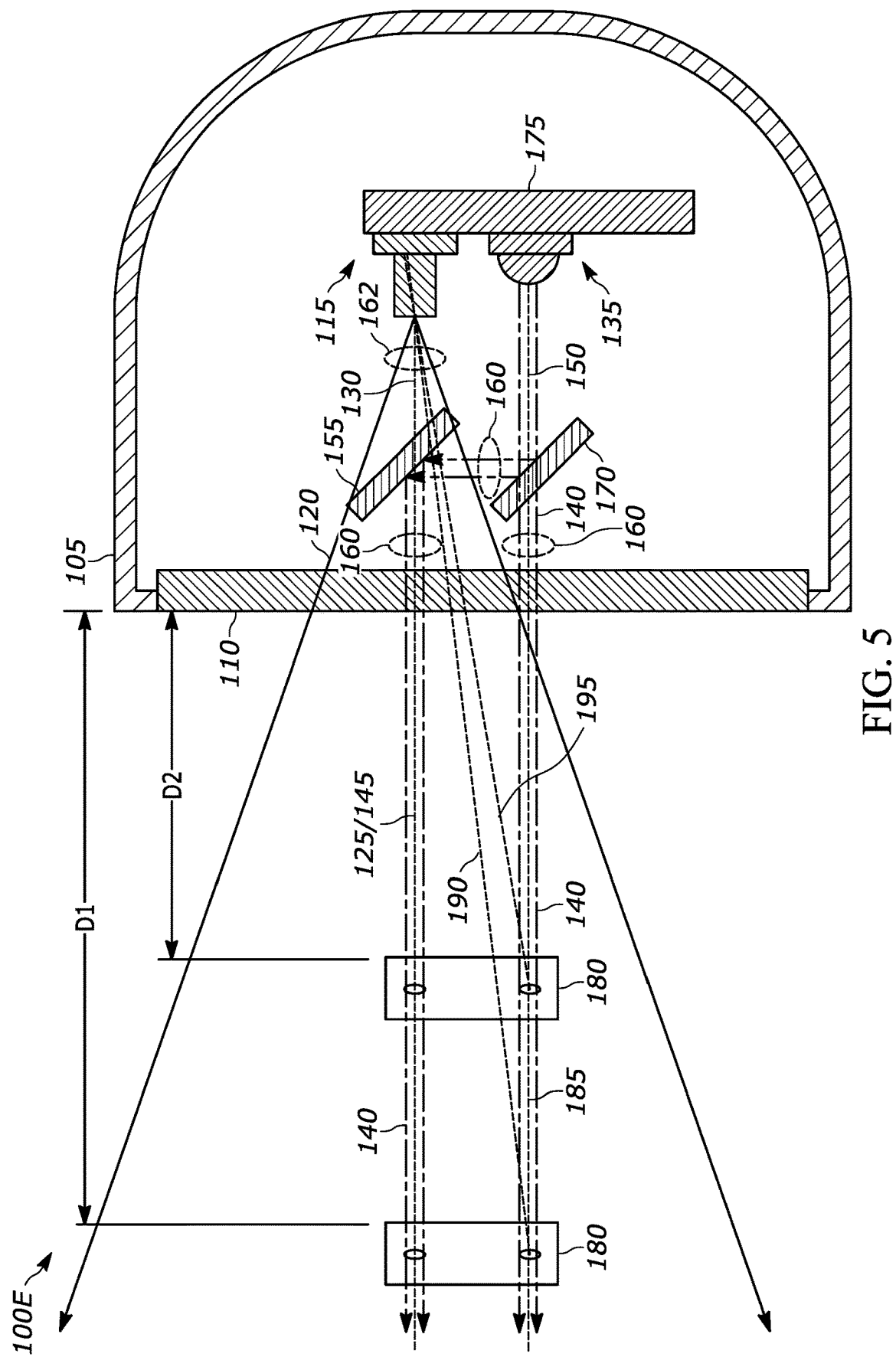
FIG. 5 illustrates a side cross-sectional schematic view of a third example barcode reader having two transflective mirrors that can be used to determine a distance of an object from the barcode reader.

Referring to FIG. 5, barcode reader 100E can also be configured so that barcode reader 100E can determine a distance between an object 180 within field-of-view 120 of imaging sensor 115 and barcode reader 100E. In barcode reader 100E, a second transflective mirror 170 is positioned within housing 105 and in the path of illumination pattern 140 from illumination source 135 and imaging axis 130 of imaging sensor 115 is aligned parallel to illumination axis 150 of illumination source 135. With imaging axis 130 of imaging sensor 115 aligned parallel to an illumination axis 150 of illumination source 135, imaging sensor 115 and illumination source 135 could both be mounted to a common printed circuit board 175. In this example, illumination pattern 140 from illumination source 135 passes through second transflective mirror 170 and out window 110, preferably along a third central axis 185 that is substantially parallel to first central axis 125 of field-of-view 120 of imaging sensor 115, with second transflective mirror 170 in the transmissive state and illumination pattern 140 from illumination source 135 is reflected off of second transflective mirror 170 towards first transflective mirror 155 and is reflected off of first transflective mirror 155 and out window 110 along second central axis 145 of illumination pattern 140 that is coaxial with first central axis 125 of field-of-view 120 of imaging sensor 115 with second transflective mirror in the reflective state.

With illumination pattern 140 being directed out of window 110 along second central axis 145, illumination pattern 140 will always be captured at a constant position/pixel of imaging sensor 115, preferably at or near the center. Conversely, with illumination pattern 140 being directed out of window 110 along third central axis 185, illumination pattern 140 will be captured at different positions/pixels on imaging sensor 115 depending on the distance of object 180 from barcode reader 100E. Since the position/pixel of illumination pattern 140 on imaging sensor 115 will be constant regardless of the distance of object 180 from barcode reader 100E and the position/pixel of illumination pattern 140 on imaging sensor 115 will be different depending on the distance of object 180 from barcode reader 100E, the distance between the positions/pixels of illumination pattern 140 between these two states can be used to determine the distance of object 180 from barcode reader 100E. For example, as shown by line 190 in FIG. 5, with object 180 a first distance D1 away from barcode reader 100E, illumination pattern 140 along third central axis 185 will be detected and captured by imaging sensor 115 at a particular pixel, or set of pixels. Conversely, as shown by line 195 in FIG. 5, with object 180 a second distance D2 away from barcode reader 100E, illumination pattern 140 along third central axis 185 will be detected and captured by imaging sensor 115 at a different pixel, or set of pixels. Therefore, the distance between the pixel, or set of pixels, detected with illumination pattern 140 along second central axis 145 and the pixel, or set of pixels, detected with illumination pattern 140 along third central axis 185 can be used to determine the distance from object 180 to barcode reader 100E since the distance between the pixel, or set of pixels, detected with illumination pattern 140 along second central axis 145 and the pixel, or set of pixels, detected with illumination pattern 140 along third central axis 185 will change as the distance between object 180 and barcode reader 100E changes.

In addition, optical element 160 could also be positioned in the path of illumination pattern 140 from illumination source 135 and can be positioned either between second transflective mirror 170 and window 110, between second transflective mirror 170 and first transflective mirror 155, or between first transflective mirror 155 and window 110, to focus or collimate illumination pattern 140 from illumination source 135 or to create a specific pattern. With optical element 160 positioned between second transflective mirror 170 and window 110, illumination pattern 140 that passes through second transflective mirror 170 and out window 110 with second transflective mirror 170 in the transmissive state is modified by optical element 160 and illumination pattern 140 that is reflected off of second transflective mirror 170 and first transflective mirror 155 and out window 110 with second transflective mirror 170 and first transflective mirror 155 in the reflective state is not modified by optical element 160. Conversely, with optical element 160 positioned between second transflective mirror 170 and first transflective mirror 155 or between first transflective mirror 155 and window 110, illumination pattern 140 that passes through second transflective mirror 170 and out window 110 with second transflective mirror 170 in the transmissive state is not modified by optical element 160 and illumination pattern 140 that is reflected off of second transflective mirror 170 and first transflective mirror 155 and out window 110 with second transflective mirror 170 and first transflective mirror 155 in the reflective state is modified by optical element 160.

If optical element 160 were used and positioned between second transflective mirror 170 and window 110 or between second transflective mirror 170 and first transflective mirror 155, optical element 160 can also be a polarizing lens to filter the light along either first central axis 125 or third central axis 185 to reduce or eliminate specular reflections. With optical element 160 positioned between second transflective mirror 170 and window 110, light that passes through second transflective mirror 170 along third central axis 185 with second transflective mirror 170 in the transmissive state would be polarized and light reflected off of second transflective mirror 170 and first transflective mirror 155 with second transflective mirror 170 and first transflective mirror 155 both in the reflective state would not be polarized. Conversely, with optical element 160 positioned between second transflective mirror 170 and first transflective mirror 155, light that passes through second transflective mirror 170 along third central axis 185 with second transflective mirror 170 in the transmissive state would not be polarized and light reflected off of second transflective mirror 170 and first transflective mirror 155 with second transflective mirror 170 and first transflective mirror 155 both in the reflective state would be polarized. In either configuration, if optical element 160 were a polarizing lens, a polarizer 162 can also be positioned between imaging sensor 115 and first transflective mirror 155 to filter the light directed towards imaging sensor 115 and would preferably be polarized in a direction that is perpendicular to the polarization of optical element 160.

Figure 6:
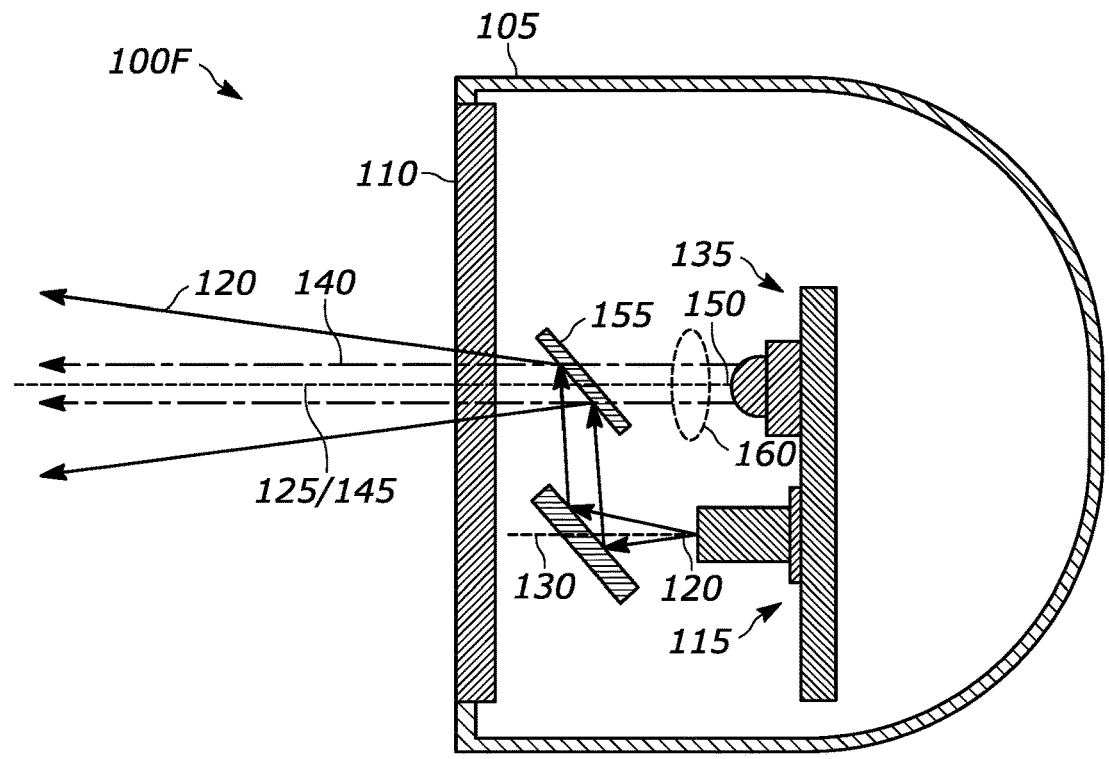
FIG. 6 illustrates a side cross-sectional schematic view of a fourth example barcode reader having a transflective mirror.
Figure 7:
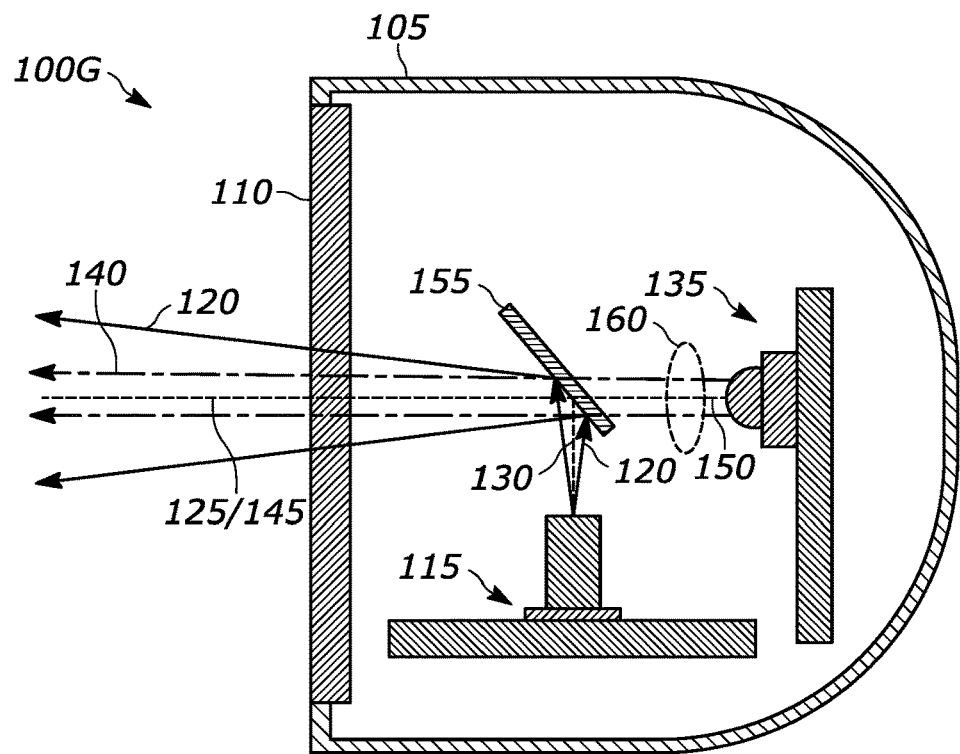
FIG. 7 illustrates a side cross-sectional schematic view of a fifth example barcode reader having a transflective mirror.

Referring to FIGS. 6 and 7, in barcode readers 100F and 100G, first transflective mirror 155 can also be positioned in a path of illumination pattern 140 from illumination source 135. In these examples, with first transflective mirror 155 in a transmissive state, illumination pattern 140 from illumination source 135 passes through first transflective mirror 155 and out window 110 and field-of-view 120 of imaging sensor 115 passes through first transflective mirror 155 and is not directed out of window 110. With first transflective mirror 155 in the reflective state, field-of-view 120 of imaging sensor 115 is reflected off of first transflective mirror 155 and out window 110 and illumination pattern 140 is reflected off of first transflective mirror 155 and is not directed out of window 110. Optionally, first transflective mirror 155 could also be switched to a transflective state, in which first transflective mirror 155 is partially reflective and partially transmissive, and first transflective mirror 155 would both allow illumination pattern 140 from illumination source 135 to pass through first transflective mirror 155 and out of window 110 and field-of-view 120 of imaging sensor 115 to be reflected off of transflective mirror and out of window 110, which could be used for calibration or picklist.

In one possible configuration, the switching of first transflective mirror 155 between the reflective and transmissive states can be synchronized with the frame rate of imaging sensor 115 such that first transflective mirror 155 changes states between the reflective and transmissive states between each image capture of imaging sensor 115. Therefore, with an imaging sensor having a frame rate of 120 frames-per-second, there would still be 60 frames-per-second captured by imaging sensor when first transflective mirror 155 is in the reflective state. Alternatively, first transflective mirror 155 can be switched between the transmissive and reflective states at any rate and time desired. For example, in a second possible configuration, the switching of first transflective mirror 155 between the reflective and transmissive states can be synchronized with the frame rate of imaging sensor 115 such that first transflective mirror 155 alternates and changes state between the reflective and transmissive states after two image captures of imaging sensor 115 and then changes back between the reflective and transmissive states after one image capture of imaging sensor 115.

As shown in FIG. 6, in barcode reader 100F, mirror 165 can be positioned within housing 105 in the path of field-of-view 120 of imaging sensor 115 to reflect field-of-view towards first transflective mirror 155. In this example, imaging axis 130 of imaging sensor 115 is aligned parallel to an illumination axis 150 of illumination source 135 and field-of-view 120 is reflected off of mirror 165 towards first transflective mirror 155 and off of first transflective mirror 155 and out of window 110 with first transflective mirror 155 in the reflective state. With imaging axis 130 of imaging sensor 115 aligned parallel to an illumination axis 150 of illumination source 135, imaging sensor 115 and illumination source 135 could both be mounted to common printed circuit board 175. Optical element 160 could also be positioned in the path of illumination pattern 140 from illumination source 135 between illumination source 135 and first transflective mirror 155 to focus or collimate illumination pattern 140 from illumination source 135 or to create a specific pattern. For example, illumination pattern 140 can be focused so that illumination pattern 140 that passes through window 110 produces a specified pattern within field-of-view 120 of imaging sensor 115 (FIG. 6) or illumination pattern 140 can be focused so that illumination pattern 140 that passes through window 110 is the same size as field-of-view 120 of imaging sensor 115 that passes through window 110. In either configuration, illumination pattern 140 can be focused to be any pattern, such as an aiming dot (FIG. 8A), a line (FIG. 8B), a cross pattern (FIG. 8C) that could match the edges of field-of-view 120 of imaging sensor 115, a rectangle (FIG. 8E) that could match the edges of field-of-view 120 of imaging sensor 115, one or more corner brackets (FIG. 8D) that could match the edges of field-of-view 120 of imaging sensor 115, a changing structured light pattern (FIG. 8F), etc. A changing structured light pattern can be projected directly over field-of-view 120 of imaging sensor 115 with zero parallax and could be used to communicate various things to a user, such as: (1) displaying a warning for an expired item as indicated by the barcode; (2) a notice that a security check is required for a restricted or high security item (e.g., tobacco, alcohol, firearms, etc.); (3) a pattern that are associated with specific items; and/or (4) an overlay of expected adjacent symbols or elements that should be near the barcode to aid in the identification of ticket switching.

Conversely, as shown in FIG. 7, in barcode reader 100G, imaging axis 130 of imaging sensor 115 could be aligned perpendicular to illumination axis 150 of illumination source 135 and first transflective mirror 155 could be positioned directly in the path of field-of-view 120 of imaging sensor 115 and directly in a path of illumination pattern 140 from illumination source 135. In these examples, an additional mirror is not required to direct illumination pattern 140 from illumination source 135 towards first transflective mirror 155, however, imaging sensor 115 and illumination source 135 would most likely be mounted to two separate printed circuit boards within housing 105. Optical element 160 could also be positioned in the path of illumination pattern 140 from illumination source 135 between illumination source 135 and first transflective mirror 155 to focus or collimate illumination pattern 140 from illumination source 135 or to create a specific pattern. For example, illumination pattern 140 can be focused so that illumination pattern 140 that passes through window 110 produces a specified pattern within field-of-view 120 of imaging sensor 115 (FIG. 7) or illumination pattern 140 can be focused so that illumination pattern 140 that passes through window 110 is the same size as field-of-view 120 of imaging sensor 115 that passes through window 110. In either configuration, illumination pattern 140 can be focused to be any pattern, such as an aiming dot (FIG. 8A), a line (FIG. 8B), a cross pattern (FIG. 8C) that could match the edges of field-of-view 120 of imaging sensor 115, a rectangle (FIG. 8E) that could match the edges of field-of-view 120 of imaging sensor 115, one or more corner brackets (FIG. 8D) that could match the edges of field-of-view 120 of imaging sensor 115, a changing structured light pattern (FIG. 8F), etc. A changing structured light pattern can be projected directly over field-of-view 120 of imaging sensor 115 with zero parallax and could be used to communicate various things to a user, such as: (1) displaying a warning for an expired item as indicated by the barcode; (2) a notice that a security check is required for a restricted or high security item (e.g., tobacco, alcohol, firearms, etc.); (3) a pattern that are associated with specific items; and/or (4) an overlay of expected adjacent symbols or elements that should be near the barcode to aid in the identification of ticket switching.

Referring to FIGS. 9-16, example barcode readers 200A-H are shown that use a transflective mirror to provide on-axis and off-axis illumination from a single illumination source. In the examples shown, barcode readers 200A-H include a housing 205 with a window 210 positioned within housing 205, imaging sensor 215 and illumination source 235 positioned within housing 205, and a transflective mirror 255, such as the e-TransFlector™ from Kent Optronics, positioned within housing 205 and in a path of an illumination pattern 240 from illumination source 235. Imaging sensor 215 can include a cylinder and/or a lens system to assist in directing a field-of-view 220 of imaging sensor 215, if desired. Unless specified in a particular example, illumination source 235 can be an illumination assembly or an aiming assembly. Aiming assemblies typically provide some very defined illumination pattern to help a user visualize some portion of a field-of-view and illumination assemblies help to deliver sufficient light into the direction of the field-of-view to sufficiently illuminate a target that is within that field-of-view for image capture (similar to a flash on a camera). These systems are normally independent. Aiming assemblies and illumination assemblies are also generally activated at different times. This is because a broad illumination of a field-of-view through an illumination assembly (especially one that has diffuse light) will do little to identify the defined features of a field-of-view. For instance, due to the scattered nature of diffuse light, such light cannot provide a defined feature like an image of a dot, which could reference a center of a field-of-view or an image of a line that could reference a boundary of a field-of-view. In addition, a broad illumination of a field-of-view can impede the ability to clearly identify an aim light pattern by overpowering the light emitted by the aiming assembly with the light emitted by the illumination assembly. Conversely, a defined aim pattern visible during image capture when the target is being illuminated can interfere with the content of the image data, particularly when the target is a barcode. A visible aim mark positioned over a barcode and captured in an image can interfere with the ability to accurately read that barcode. Transflective mirror 255 can be switched between a transmissive state, in which a majority of light is allowed to pass through transflective mirror 255, and a reflective state, in which a majority of light is reflected off of transflective mirror 255. In these examples, illumination pattern 240 from illumination source 235 passes through transflective mirror 255 and out of window 210 with transflective mirror 255 in the transmissive state and illumination pattern 240 from illumination source 235 is reflected off of transflective mirror 255 and out of window 210 with transflective mirror 255 in the reflective state.

In one possible configuration, the switching of transflective mirror 255 between the reflective and transmissive states can be synchronized with the frame rate of imaging sensor 215 such that transflective mirror 255 changes states between the reflective and transmissive states between each image capture of imaging sensor 215. Alternatively, transflective mirror 255 can be switched between the transmissive and reflective states at any rate and time desired. For example, in a second possible configuration, the switching of transflective mirror 255 between the reflective and transmissive states can be synchronized with the frame rate of imaging sensor 215 such that transflective mirror 255 alternates and changes state between the reflective and transmissive states after two image captures of imaging sensor 215 and then changes back between the reflective and transmissive states after one image capture of imaging sensor 215.

Figure 9:
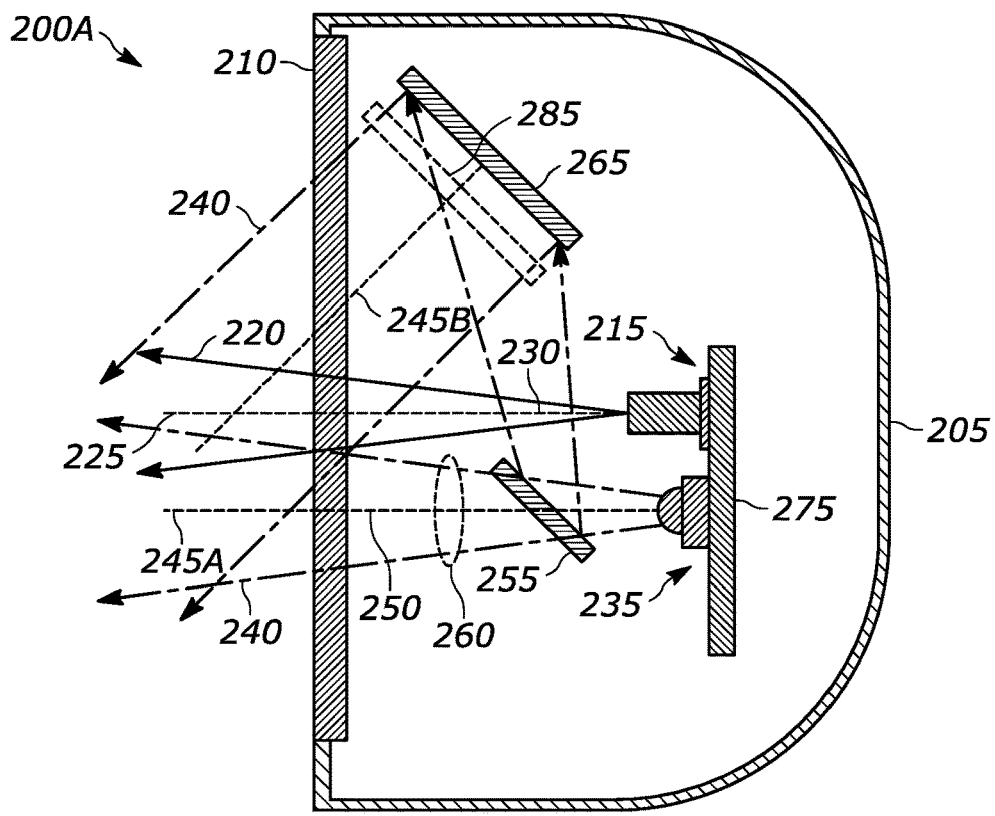
FIG. 9 illustrates a side cross-sectional schematic view of a sixth example barcode reader having a transflective mirror.
Figure 10:
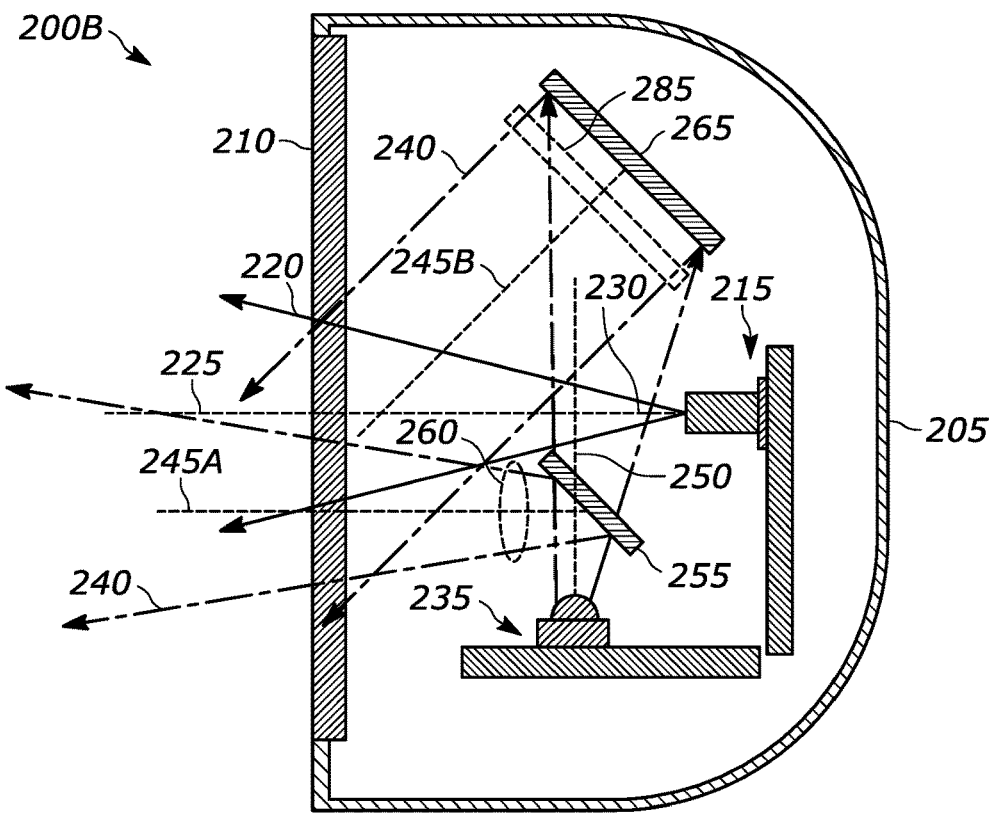
FIG. 10 illustrates a side cross-sectional schematic view of a seventh example barcode reader having a transflective mirror.

Referring specifically to FIGS. 9-10, barcode readers 200A, 200B include a mirror 265 positioned within housing 205 to direct illumination pattern 240 out of window 210 along a third central axis 245B that is non-parallel to first central axis 225 of field-of-view 220 of imaging sensor 215. In barcode reader 200A (FIG. 9), imaging axis 230 of imaging sensor 215 is aligned parallel to illumination axis 250 of illumination source 235. With imaging axis 230 of imaging sensor 215 aligned parallel to illumination axis 250 of illumination source 235, imaging sensor 215 and illumination source 235 could both be mounted to a common printed circuit board 275. In this configuration, illumination pattern 240 from illumination source 235 passes through transflective mirror 255 and out of window 210 along a second central axis 245A of illumination pattern 240 that is substantially parallel to a first central axis 225 of field-of-view 220 of imaging sensor 215, to provide on-axis illumination, with transflective mirror 255 in the transmissive state and illumination pattern 240 is reflected off of transflective mirror 255 towards mirror 265 and is reflected off mirror 265 and out of window 210 along a third central axis 245B of illumination pattern that is non-parallel to first central axis 225 of field-of-view 220 of imaging sensor 215, to provide off-axis illumination, with transflective mirror 255 in the reflective state. Optionally, transflective mirror 255 could also be switched to a transflective state, in which transflective mirror 255 is partially reflective and partially transmissive, and transflective mirror 255 would both allow illumination pattern 240 from illumination source 235 to pass through transflective mirror 255 and out of window 210 and reflect illumination pattern 240 from illumination source 235 towards mirror 265, which could be used to provide on-axis and off-axis illumination simultaneously.

Conversely, in barcode reader 200B (FIG. 10), imaging axis 230 of imaging sensor 215 is aligned perpendicular to illumination axis 250 of illumination source 235. In this configuration, illumination pattern 240 from illumination source 235 passes through transflective mirror 255 and is reflected off of mirror 265 and out of window 210 along third central axis 245B that is non-parallel to first central axis 225 of field-of-view 220 of imaging sensor 215, to provide off-axis illumination, with transflective mirror 255 in the transmissive state and illumination pattern 240 is reflected off of transflective mirror 255 and out of window 210 along second central axis 245A that is substantially parallel to first central axis 225 of field-of-view 220, to provide on-axis illumination, with transflective mirror in the reflective state. Optionally, transflective mirror 255 could also be switched to a transflective state, in which transflective mirror 255 is partially reflective and partially transmissive, and transflective mirror 255 would both allow illumination pattern 240 from illumination source 235 to pass through transflective mirror 255 and towards mirror 265 and reflect illumination pattern 240 from illumination source 235 out of window 210, which could be used to provide on-axis and off-axis illumination simultaneously.

Both barcode reader 200A and barcode reader 200B can also include a modifying optical component 285, such as a filter, aperture, polarizer, diffractive optical element, refractive optical element, collimator, etc., positioned between mirror 265 and window 210 to alter illumination pattern 240 of illumination source 235. Using modifying optical component 285, two different types of illumination can be provided. For example, a broad light source can be provided on-axis along second central axis 245A and modifying optical component 285 can be used to create an aiming pattern, change the color of the illumination, etc. off-axis along third central axis 245B. In addition, barcode reader 200A and barcode reader 200B can include an optical element 260, such as a lens, a polarizer, a filter, an aperture, a diffractive optical element, a refractive optical element, etc., positioned in the path of illumination pattern 240 from illumination source 235 between transflective mirror 255 and window 210 to focus, collimate, colorize, etc., illumination pattern 240 from illumination source 235 or to create a specific pattern. For example, illumination pattern 240 can be focused to be any pattern, such as an aiming dot (FIG. 8A), a line (FIG. 8B), a cross pattern (FIG. 8C) that could match the edges of field-of-view 220 of imaging sensor 215, a rectangle (FIG. 8E) that could match the edges of field-of-view 220 of imaging sensor 215, one or more corner brackets (FIG. 8D) that could match the edges of field-of-view 220 of imaging sensor 215, a changing structured light pattern (FIG. 8F), etc. A changing structured light pattern can be projected over field-of-view 220 of imaging sensor 215 and could be used to communicate various things to a user, such as: (1) displaying a warning for an expired item as indicated by the barcode; (2) a notice that a security check is required for a restricted or high security item (e.g., tobacco, alcohol, firearms, etc.); (3) a pattern that are associated with specific items; and/or (4) an overlay of expected adjacent symbols or elements that should be near the barcode to aid in the identification of ticket switching. With optical element 260 positioned between transflective mirror 255 and window 210, illumination pattern 240 that passes through transflective mirror 255 and is reflected off of mirror 265 and out window 210 with transflective mirror 255 in the transmissive state is not modified by optical element 260 and illumination pattern 240 that is reflected off of transflective mirror 255 and out window 210 with transflective mirror 255 in the reflective state is modified by optical element 260.

Figure 11:
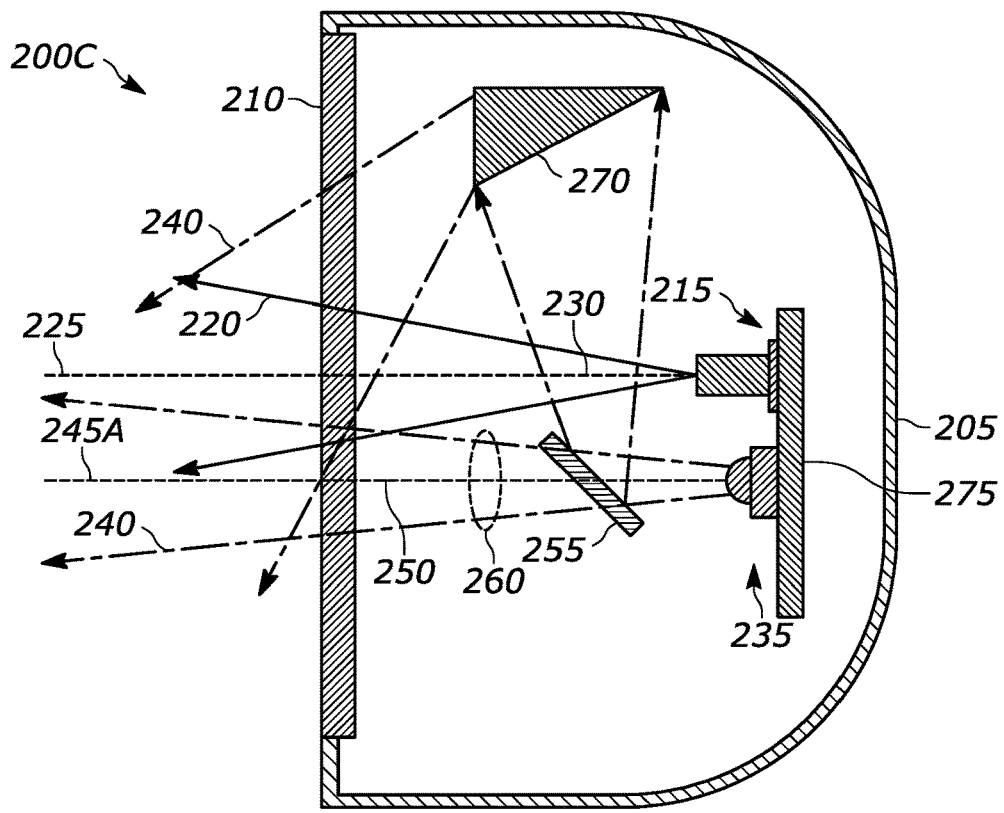
FIG. 11 illustrates a side cross-sectional schematic view of a eighth example barcode reader having a transflective mirror.
Figure 12:
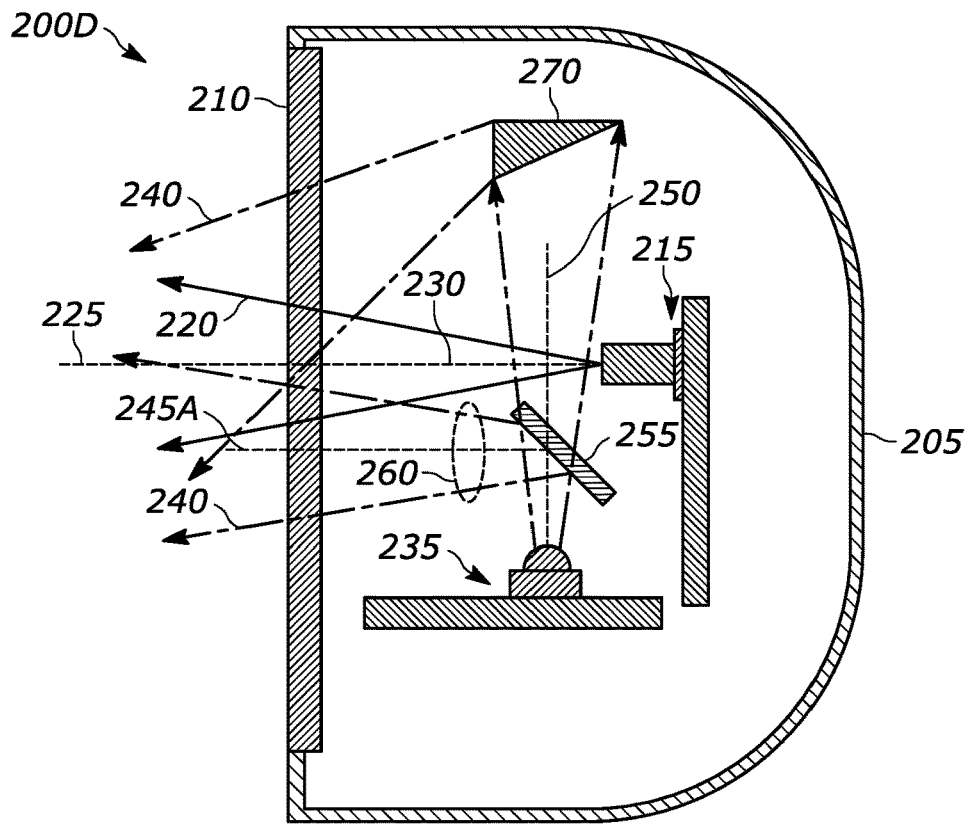
FIG. 12 illustrates a side cross-sectional schematic view of a ninth example barcode reader having a transflective mirror.

Referring specifically to FIGS. 11-12, barcode readers 200C, 200D include a diffuser 270 positioned within housing 205 to provide a more narrow or direct illumination through window 210 and diffuse illumination out of window 210 using a single illumination source 235. In barcode reader 200C (FIG. 11), imaging axis 230 of imaging sensor 215 is aligned parallel to illumination axis 250 of illumination source 235. With imaging axis 230 of imaging sensor 215 aligned parallel to illumination axis 250 of illumination source 235, imaging sensor 215 and illumination source 235 could both be mounted to a common printed circuit board 275. In this configuration, illumination pattern 240 from illumination source 235 passes through transflective mirror 255 and out of window 210 along second central axis 245A of illumination pattern 240 that is substantially parallel to first central axis 225 of field-of-view 220 of imaging sensor 215, to provide on-axis illumination, with transflective mirror 255 in the transmissive state and illumination pattern 240 is reflected off of transflective mirror 255 towards diffuser 270 and is diffused and directed by diffuser 270 out of window 210, to provide diffuse illumination, with transflective mirror 255 in the reflective state. In addition to diffusing the illumination pattern 240 from illumination source 235, diffuser 270 can also be used to change the color of illumination pattern 240. For example, illumination source 235 can provide illumination pattern 240 as a red or white aiming dot along second central axis 245A with transflective mirror 255 in the transmissive state and, upon determination of a successful barcode scan, transflective mirror 255 can be switched to the reflective state to direct illumination pattern 240 through diffuser 270, which can diffuse illumination pattern 240 and change it green to provide a green light to indicate to a user the successful scan. Optionally, transflective mirror 255 could also be switched to a transflective state, in which transflective mirror 255 is partially reflective and partially transmissive, and transflective mirror 255 would both allow illumination pattern 240 from illumination source 235 to pass through transflective mirror 255 and out of window 210 and reflect illumination pattern 240 from illumination source 235 towards diffuser 270, which could be used to provide direct and diffuse illumination simultaneously.

Conversely, in barcode reader 200D (FIG. 12), imaging axis 230 of imaging sensor 215 is aligned perpendicular to illumination axis 250 of illumination source 235. In this configuration, illumination pattern 240 from illumination source 235 passes through transflective mirror 255 and is diffused and directed by diffuser 270 out of window 210, to provide diffuse illumination, with transflective mirror 255 in the transmissive state and illumination pattern 240 is reflected off of transflective mirror 255 and out of window 210 along second central axis 245A that is substantially parallel to first central axis 225 of field-of-view 220, to provide on-axis illumination, with transflective mirror in the reflective state. In addition to diffusing the illumination pattern 240 from illumination source 235, diffuser 270 can also be used to change the color of illumination pattern 240. For example, illumination source 235 can provide illumination pattern 240 as a red or white aiming dot along second central axis 245A with transflective mirror 255 in the transmissive state and, upon determination of a successful barcode scan, transflective mirror 255 can be switched to the reflective state to direct illumination pattern 240 through diffuser 270, which can diffuse illumination pattern 240 and change it green to provide a green light to indicate to a user the successful scan. Optionally, transflective mirror 255 could also be switched to a transflective state, in which transflective mirror 255 is partially reflective and partially transmissive, and transflective mirror 255 would both allow illumination pattern 240 from illumination source 235 to pass through transflective mirror 255 and out of window 210 and reflect illumination pattern 240 from illumination source 235 towards diffuser 270, which could be used to provide direct and diffuse illumination simultaneously.

Both barcode reader 200C and barcode reader 200D can also include optical element 260 positioned in the path of illumination pattern 240 from illumination source 235 between transflective mirror 255 and window 210 to focus, collimate, colorize, etc., illumination pattern 240 from illumination source 235 or to create a specific pattern. For example, illumination pattern 240 can be focused to be any pattern, such as an aiming dot (FIG. 8A), a line (FIG. 8B), a cross pattern (FIG. 8C) that could match the edges of field-of-view 220 of imaging sensor 215, a rectangle (FIG. 8E) that could match the edges of field-of-view 220 of imaging sensor 215, one or more corner brackets (FIG. 8D) that could match the edges of field-of-view 220 of imaging sensor 215, a changing structured light pattern (FIG. 8F), etc. A changing structured light pattern can be projected over field-of-view 220 of imaging sensor 215 and could be used to communicate various things to a user, such as: (1) displaying a warning for an expired item as indicated by the barcode; (2) a notice that a security check is required for a restricted or high security item (e.g., tobacco, alcohol, firearms, etc.); (3) a pattern that are associated with specific items; and/or (4) an overlay of expected adjacent symbols or elements that should be near the barcode to aid in the identification of ticket switching. With optical element 260 positioned between transflective mirror 255 and window 210, illumination pattern 240 that passes through transflective mirror 255 and is reflected off of mirror 265 and out window 210 with transflective mirror 255 in the transmissive state is not modified by optical element 260 and illumination pattern 240 that is reflected off of transflective mirror 255 and out window 210 with transflective mirror 255 in the reflective state is modified by optical element 260.

Figure 13:
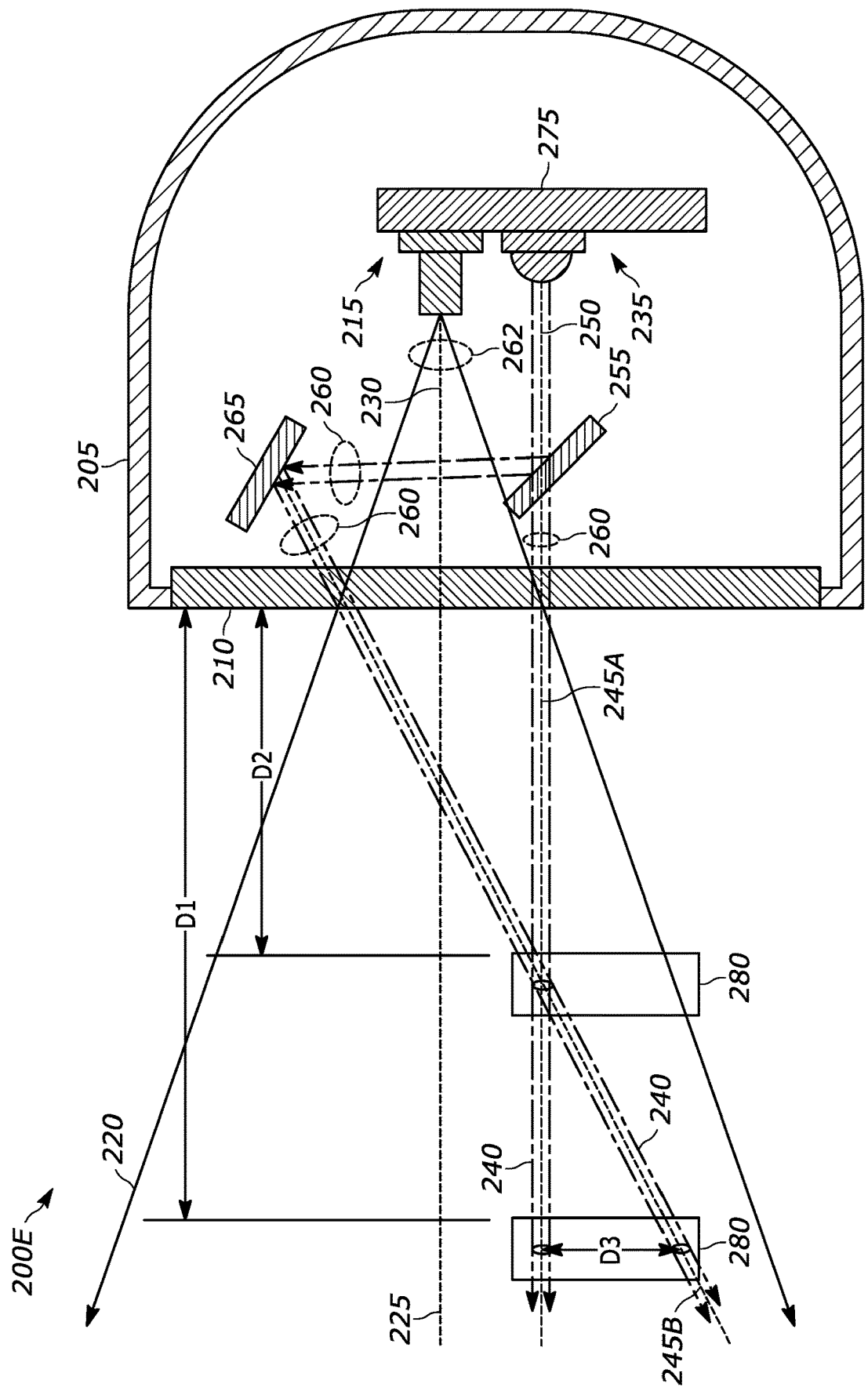
FIG. 13 illustrates a side cross-sectional schematic view of a tenth example barcode reader having a transflective mirror that can be used to determine a distance of an object from the barcode reader.

Referring to FIG. 13, barcode reader 200E can also be configured so that barcode reader 200E can be used to determine a distance between an object 280 within field-of-view 220 of imaging sensor 215 and barcode reader 200E. In barcode reader 200E, mirror 265 is positioned within housing 205 and imaging axis 230 of imaging sensor 215 is aligned parallel to illumination axis 250 of illumination source 235. With imaging axis 230 of imaging sensor 215 aligned parallel to illumination axis 250 of illumination source 235, imaging sensor 215 and illumination source 235 could both be mounted to a common printed circuit board 275. Illumination pattern 240 is preferably a narrow beam illumination, such as an aiming dot, and illumination pattern 240 from illumination source 235 passes through transflective mirror 255 and out of window 210 along second central axis 245A that is substantially parallel to first central axis 225 of field-of-view 220 of imaging sensor 215 with transflective mirror 255 in the transmissive state. Illumination pattern 240 is reflected off of transflective mirror 255 towards mirror 265 and is reflected off of mirror 265 and out of window 210 along third central axis 245B of illumination pattern 240 that is non-parallel to first central axis 225 of field-of-view 220 with transflective mirror 255 in the reflective state.

In addition, optical element 260 could also be positioned in the path of illumination pattern 240 from illumination source 235 and can be positioned either between transflective mirror 255 and window 210, between transflective mirror 255 and mirror 265, or between mirror 265 and window 210, to focus or collimate illumination pattern 240 from illumination source 235 or to create a specific pattern. With optical element 260 positioned between transflective mirror 255 and window 210, illumination pattern 240 that passes through transflective mirror 255 and out window 210 with transflective mirror 255 in the transmissive state is modified by optical element 260 and illumination pattern 240 that is reflected off of transflective mirror 255 and mirror 265 and out window 210 with transflective mirror 255 in the reflective state is not modified by optical element 260. Conversely, with optical element 260 positioned between transflective mirror 255 and mirror 265 or between mirror 265 and window 210, illumination pattern 240 that passes through transflective mirror 255 and out window 210 with transflective mirror 255 in the transmissive state is not modified by optical element 260 and illumination pattern 240 that is reflected off of transflective mirror 255 and mirror 265 and out window 210 with transflective mirror 255 in the reflective state is modified by optical element 260.

In this example, optical element 260 can also be a polarizing lens to filter the light along either second central axis 245A or third central axis 245B to reduce or eliminate specular reflections. With optical element 260 positioned between transflective mirror 255 and window 210, light that passes through transflective mirror 255 and out window 210 along second central axis 245A with transflective mirror 255 in the transmissive state would be polarized and light reflected off of transflective mirror 255 and mirror 265 and out window 210 along third central axis 245B with transflective mirror 255 in the reflective state would not be polarized. Conversely, with optical element 260 positioned between transflective mirror 255 and mirror 265 or between mirror 265 and window 210, light that passes through transflective mirror 255 and out window 210 along second central axis 245A with transflective mirror 255 in the transmissive state would not be polarized and light reflected off of transflective mirror 255 and mirror 265 and out window 210 along third central axis 245B with transflective mirror 255 in the reflective state would be polarized. In any of these configurations, if optical element 260 were a polarizing lens, a polarizer 262 can also be positioned in front of imaging sensor 215 to filter the light directed towards imaging sensor 215 and would preferably be polarized in a direction that is perpendicular to the polarization of optical element 260.

Because illumination pattern 240 is substantially parallel to first central axis 225 of field-of-view 220 with transflective mirror 255 in the transmissive state and illumination pattern 240 is not coaxial with first central axis 225 with transflective mirror 255 in the reflective state, the magnitude of the parallax between illumination pattern 240 with transflective mirror in each state can be used to determine the distance between object 280 and barcode reader 200E, which can be used to restrict the reading range, optimize illumination, focus, exposure, image processing, decryption algorithms, etc. For example, during calibration of barcode reader 200E, object 180 can be placed at a known distance D1 from barcode reader 200E and images can be captured by imaging sensor 215 with transflective mirror 255 in the reflective state and in the transmissive state. Based on these two images, a distance D3 can be determined between the patterns captured in each image. Based on the known distance D1 and the measured distance D3, a tan(alpha) value can be determined using the equation tan(alpha)=D1/D3 and the tan(alpha) value then saved. Once the tan(alpha) value has been saved, when object 280 is placed an unknown distance D2 from barcode reader 100E, the distance D2 can then be determined by again capturing images with transflective mirror 255 in the reflective state and in the transmissive state and the distance D2 determined using the equation D2=(new distance between patterns from each image)/(saved tan(alpha)).

In addition, rather than calculating a distance between object 280 and barcode reader 200E, the same configuration can be used to guide a user to an optimal scanning distance. For example, as shown in FIG. 13, when object 280 is at a first distance D1 away from barcode reader 200E, the patterns created by illumination pattern 240 with transflective mirror 255 in the transmissive state and in the reflective state will be distance D3 apart. As barcode reader 200E is moved closer to object 280, this distance between the patterns will decrease until both patterns appear on object 280 at the same place, which can be configured as the optimal scanning distance for barcode reader 200E.

Figure 14:
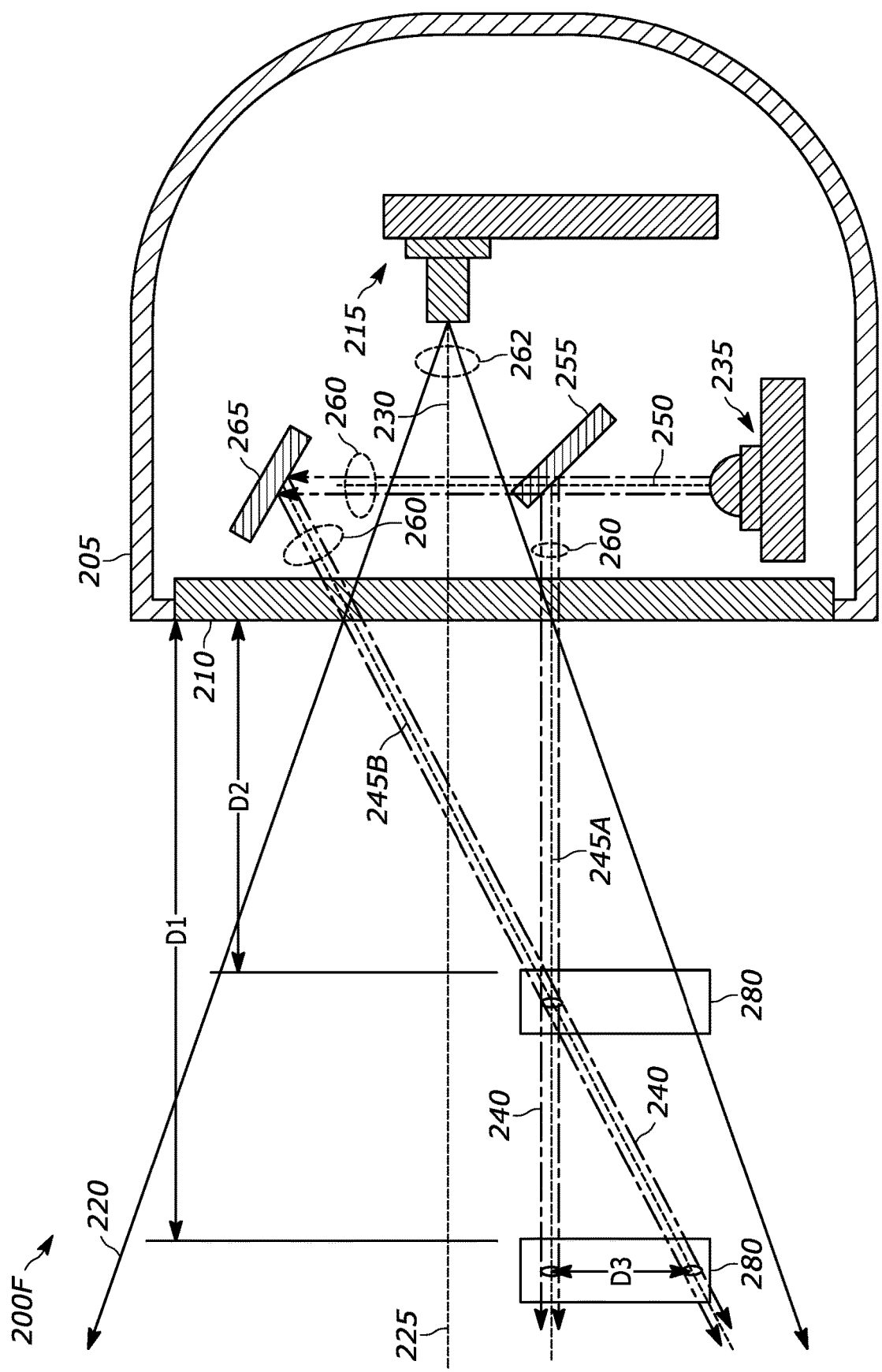
FIG. 14 illustrates a side cross-sectional schematic view of a eleventh example barcode reader having a transflective mirror that can be used to determine a distance of an object from the barcode reader.

Referring to FIG. 14, barcode reader 200F is the same as barcode reader 200E except that imaging axis 230 of imaging sensor 215 is aligned perpendicular to illumination axis 250 of illumination source 235 so that illumination pattern 240 from illumination source 235 passes through transflective mirror 255 towards mirror 265 and is reflected off of mirror 265 and out of window 210 along third central axis 245B of illumination pattern 240 that is non-parallel to first central axis 225 of field-of-view 220 with transflective mirror 255 in the transmissive state and illumination pattern 240 is reflected off of transflective mirror 255 and out of window 210 along second central axis 245A that is substantially parallel to first central axis 225 of field-of-view 220 of imaging sensor 215 with transflective mirror 255 in the reflective state. Barcode reader 200F can be used to determine the distance of object 280 from barcode reader 200F in the same manner described above for barcode reader 200E.

In addition, optical element 260 could also be positioned in the path of illumination pattern 240 from illumination source 235 and can be positioned either between transflective mirror 255 and window 210, between transflective mirror 255 and mirror 265, or between mirror 265 and window 210, to focus or collimate illumination pattern 240 from illumination source 235 or to create a specific pattern. With optical element 260 positioned between transflective mirror 255 and window 210, illumination pattern 240 that is reflected off of transflective mirror 255 and out window 210 with transflective mirror 255 in the reflective state is modified by optical element 260 and illumination pattern 240 that passes through transflective mirror 255 and is reflected off of mirror 265 and out window 210 with transflective mirror 255 in the transmissive state is not modified by optical element 260. Conversely, with optical element 260 positioned between transflective mirror 255 and mirror 265 or between mirror 265 and window 210, illumination pattern 240 that is reflected off of transflective mirror 255 and out window 210 with transflective mirror 255 in the reflective state is not modified by optical element 260 and illumination pattern 240 that passes through transflective mirror 255 and is reflected off of mirror 265 and out window 210 with transflective mirror 255 in the transmissive state is modified by optical element 260.

In this example, optical element 260 can also be a polarizing lens to filter the light along either second central axis 245A or third central axis 245B to reduce or eliminate specular reflections. With optical element 260 positioned between transflective mirror 255 and window 210, light that is reflected off of transflective mirror 255 and out window 210 along second central axis 245A with transflective mirror 255 in the reflective state would be polarized and light that passes through transflective mirror 255 and is reflected off of mirror 265 and out window 210 along third central axis 245B with transflective mirror 255 in the transmissive state would not be polarized. Conversely, with optical element 260 positioned between transflective mirror 255 and mirror 265 or between mirror 265 and window 210, light that is reflected off of transflective mirror 255 and out window 210 along second central axis 245A with transflective mirror 255 in the reflective state would not be polarized and light that passes through transflective mirror 255 and is reflected off of mirror 265 and out window 210 along third central axis 245B with transflective mirror 255 in the transmissive state would be polarized. In any of these configurations, if optical element 260 were a polarizing lens, a polarizer 262 can also be positioned in front of imaging sensor 215 to filter the light directed towards imaging sensor 215 and would preferably be polarized in a direction that is perpendicular to the polarization of optical element 260.

Figure 15:
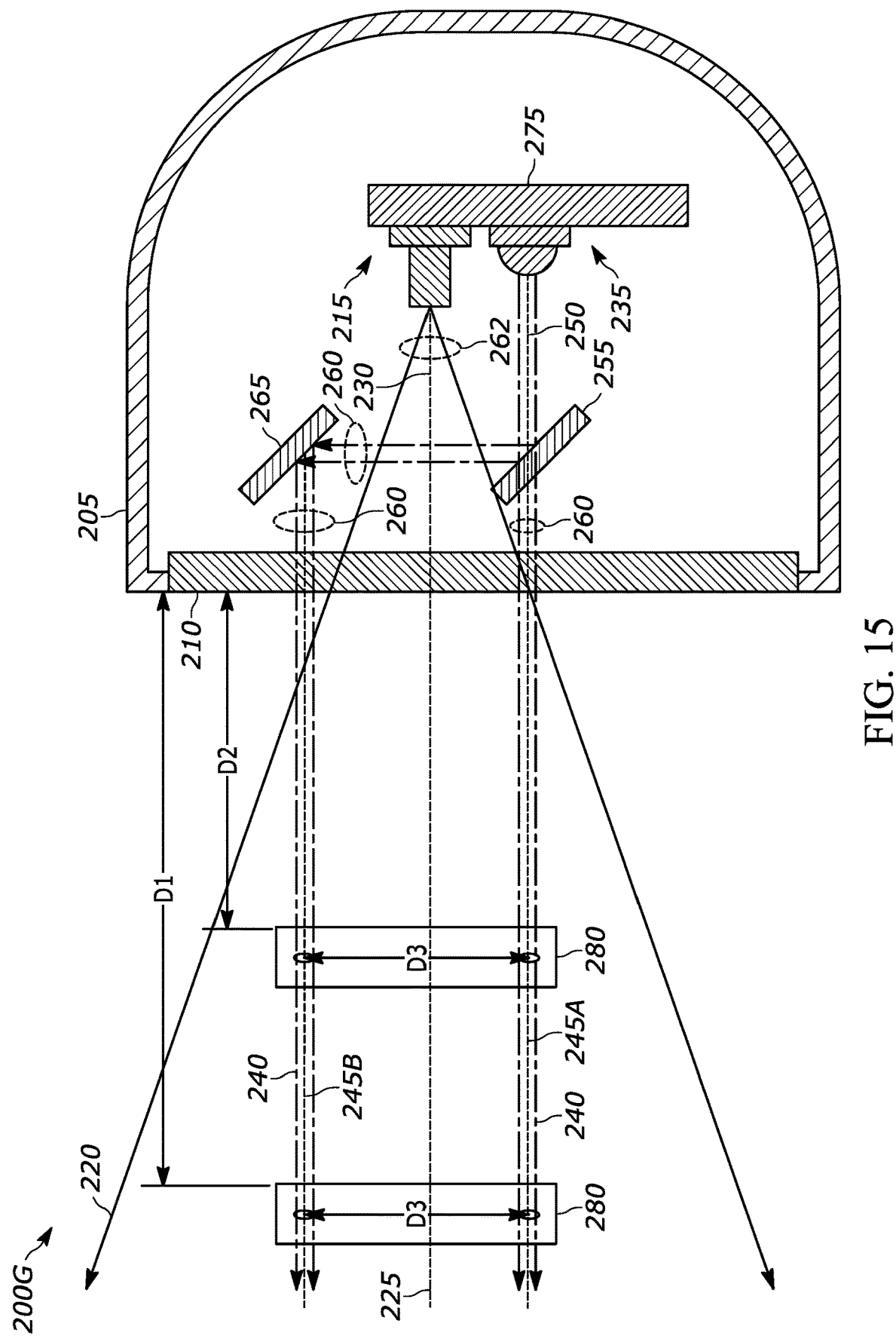
FIG. 15 illustrates a side cross-sectional schematic view of a twelfth example barcode reader having a transflective mirror that can be used to determine a distance of an object from the barcode reader.

Referring to FIG. 15, barcode reader 200G can also be configured so that barcode reader 200G can be used to determine a distance between object 280 within field-of-view 220 of imaging sensor 215 and barcode reader 200G. In barcode reader 200G, mirror 265 is positioned within housing 205 and imaging axis 230 of imaging sensor 215 is aligned parallel to illumination axis 250 of illumination source 235. With imaging axis 230 of imaging sensor 215 aligned parallel to illumination axis 250 of illumination source 235, imaging sensor 215 and illumination source 235 could both be mounted to a common printed circuit board 275. Illumination pattern 240 is preferably a narrow beam illumination, such as an aiming dot, and illumination pattern 240 from illumination source 235 passes through transflective mirror 255 and out of window 210 along second central axis 245A that is substantially parallel to first central axis 225 of field-of-view 220 of imaging sensor 215 with transflective mirror 255 in the transmissive state. Illumination pattern 240 is reflected off of transflective mirror 255 towards mirror 265 and is reflected off of mirror 265 and out of window 210 along third central axis 245B of illumination pattern 240 that is also substantially parallel to first central axis 225 of field-of-view 220 with transflective mirror 255 in the reflective state. Because illumination pattern 240 is directed out of window 210 along second central axis 245A or 245B, both of which are substantially parallel to first central axis 225 of imaging sensor 215, the distance D3 between the patterns shown on object 280 with transflective mirror in the reflective and transmissive states will be constant regardless of the distance of object 280 from barcode reader 200G. However, depending on the distance of object 280 from barcode reader 200G, the distance between the positions/pixels captured by image sensor 215 of each pattern will change. For example, with object 280 at distance D1 from barcode reader 200G, the distance between the patterns captured by image sensor 215 with transflective mirror 255 in each state and object 280 at distance D1 from barcode reader 200G will be smaller than the distance between the patterns captured by image sensor 215 with transflective mirror 255 in each state and object 280 as distance D2 from barcode reader 200G. Since the distance D3 between the patterns will not change, the changing distance between the positions/pixels captured by image sensor 215 between the patterns can then be correlated with the distance of object 280 from barcode reader 200G.

In addition, optical element 260 could also be positioned in the path of illumination pattern 240 from illumination source 235 and can be positioned either between transflective mirror 255 and window 210, between transflective mirror 255 and mirror 265, or between mirror 265 and window 210, to focus or collimate illumination pattern 240 from illumination source 235 or to create a specific pattern. With optical element 260 positioned between transflective mirror 255 and window 210, illumination pattern 240 that passes through transflective mirror 255 and out window 210 with transflective mirror 255 in the transmissive state is modified by optical element 260 and illumination pattern 240 that is reflected off of transflective mirror 255 and mirror 265 and out window 210 with transflective mirror 255 in the reflective state is not modified by optical element 260. Conversely, with optical element 260 positioned between transflective mirror 255 and mirror 265 or between mirror 265 and window 210, illumination pattern 240 that passes through transflective mirror 255 and out window 210 with transflective mirror 255 in the transmissive state is not modified by optical element 260 and illumination pattern 240 that is reflected off of transflective mirror 255 and mirror 265 and out window 210 with transflective mirror 255 in the reflective state is modified by optical element 260.

In this example, optical element 260 can also be a polarizing lens to filter the light along either second central axis 245A or third central axis 245B to reduce or eliminate specular reflections. With optical element 260 positioned between transflective mirror 255 and window 210, light that passes through transflective mirror 255 and out window 210 along second central axis 245A with transflective mirror 255 in the transmissive state would be polarized and light reflected off of transflective mirror 255 and mirror 265 and out window 210 along third central axis 245B with transflective mirror 255 in the reflective state would not be polarized. Conversely, with optical element 260 positioned between transflective mirror 255 and mirror 265 or between mirror 265 and window 210, light that passes through transflective mirror 255 and out window 210 along second central axis 245A with transflective mirror 255 in the transmissive state would not be polarized and light reflected off of transflective mirror 255 and mirror 265 and out window 210 along third central axis 245B with transflective mirror 255 in the reflective state would be polarized. In any of these configurations, if optical element 260 were a polarizing lens, a polarizer 262 can also be positioned in front of imaging sensor 215 to filter the light directed towards imaging sensor 215 and would preferably be polarized in a direction that is perpendicular to the polarization of optical element 260.

Figure 16:
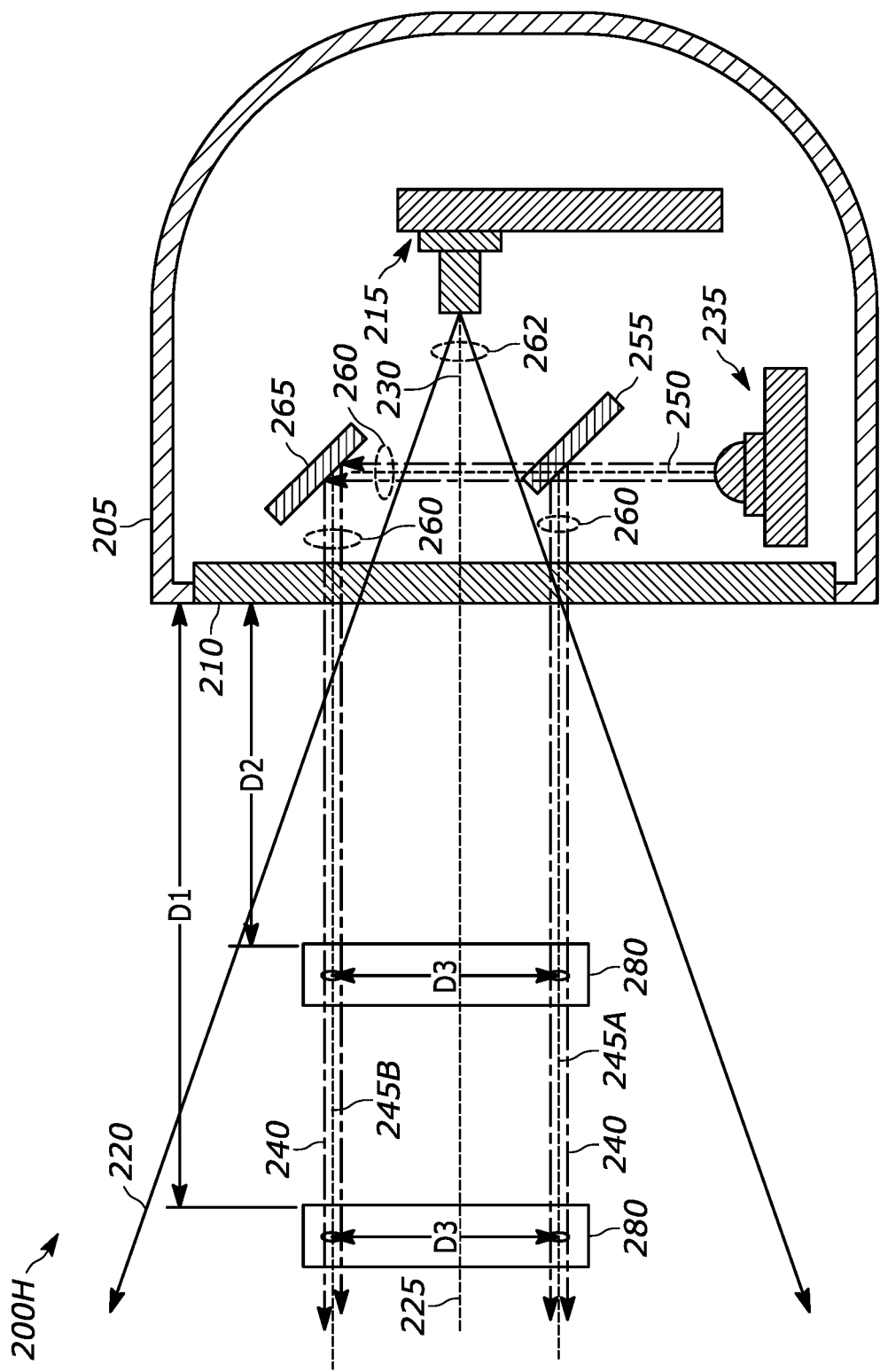
FIG. 16 illustrates a side cross-sectional schematic view of a thirteenth example barcode reader having a transflective mirror that can be used to determine a distance of an object from the barcode reader.

Referring to FIG. 16, barcode reader 200H is the same as barcode reader 200G except that imaging axis 230 of imaging sensor 215 is aligned perpendicular to illumination axis 250 of illumination source 235 so that illumination pattern 240 from illumination source 235 passes through transflective mirror 255 towards mirror 265 and is reflected off of mirror 265 and out of window 210 along third central axis 245B of illumination pattern 240 that is substantially parallel to first central axis 225 of field-of-view 220 with transflective mirror 255 in the transmissive state and illumination pattern 240 is reflected off of transflective mirror 255 and out of window 210 along second central axis 245A that is also substantially parallel to first central axis 225 of field-of-view 220 of imaging sensor 215 with transflective mirror 255 in the reflective state. Barcode reader 200H can be used to determine the distance of object 280 from barcode reader 200H in the same manner described above for barcode reader 200G.

In addition, optical element 260 could also be positioned in the path of illumination pattern 240 from illumination source 235 and can be positioned either between transflective mirror 255 and window 210, between transflective mirror 255 and mirror 265, or between mirror 265 and window 210, to focus or collimate illumination pattern 240 from illumination source 235 or to create a specific pattern. With optical element 260 positioned between transflective mirror 255 and window 210, illumination pattern 240 that is reflected off of transflective mirror 255 and out window 210 with transflective mirror 255 in the reflective state is modified by optical element 260 and illumination pattern 240 that passes through transflective mirror 255 and is reflected off of mirror 265 and out window 210 with transflective mirror 255 in the transmissive state is not modified by optical element 260. Conversely, with optical element 260 positioned between transflective mirror 255 and mirror 265 or between mirror 265 and window 210, illumination pattern 240 that is reflected off of transflective mirror 255 and out window 210 with transflective mirror 255 in the reflective state is not modified by optical element 260 and illumination pattern 240 that passes through transflective mirror 255 and is reflected off of mirror 265 and out window 210 with transflective mirror 255 in the transmissive state is modified by optical element 260.

In this example, optical element 260 can also be a polarizing lens to filter the light along either second central axis 245A or third central axis 245B to reduce or eliminate specular reflections. With optical element 260 positioned between transflective mirror 255 and window 210, light that is reflected off of transflective mirror 255 and out window 210 along second central axis 245A with transflective mirror 255 in the reflective state would be polarized and light that passes through transflective mirror 255 and is reflected off of mirror 265 and out window 210 along third central axis 245B with transflective mirror 255 in the transmissive state would not be polarized. Conversely, with optical element 260 positioned between transflective mirror 255 and mirror 265 or between mirror 265 and window 210, light that is reflected off of transflective mirror 255 and out window 210 along second central axis 245A with transflective mirror 255 in the reflective state would not be polarized and light that passes through transflective mirror 255 and is reflected off of mirror 265 and out window 210 along third central axis 245B with transflective mirror 255 in the transmissive state would be polarized. In any of these configurations, if optical element 260 were a polarizing lens, a polarizer 262 can also be positioned in front of imaging sensor 215 to filter the light directed towards imaging sensor 215 and would preferably be polarized in a direction that is perpendicular to the polarization of optical element 260.

Figure 17:
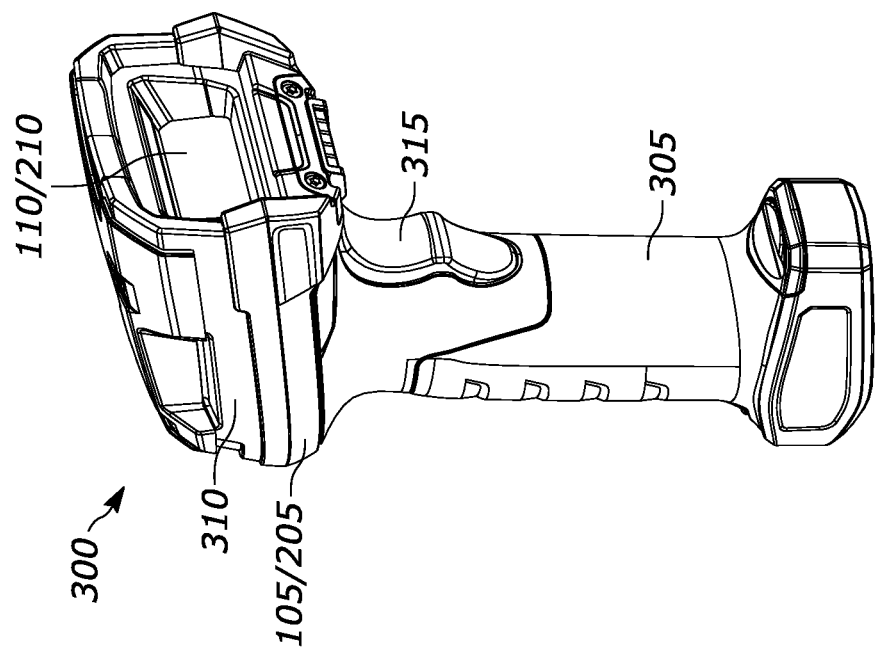
FIG. 17 illustrates a perspective view of an example barcode reader.

Referring to FIG. 17, an example barcode reader 300 is shown, which can be used to implement any of the examples shown and described herein, such as barcode readers 100A-G and 200A-H. It will be understood that although a particular embodiment of barcode reader 300 is disclosed, this disclosure is applicable to a variety of barcode readers, including, but not limited to, gun-type handheld readers, mobile computer-type readers, presentation readers, etc. As illustrated in FIG. 17, exemplary barcode reader 300 has housing 105/205 with a handle portion 305, also referred to as a handle 305, and a head portion 310, also referred to as a scanning head 310. Head portion 310 includes window 110/210, and is configured to be positioned on the top of handle portion 305. Handle portion 305 is configured to be gripped by a user (not shown) and includes a trigger 315 for activation by the user. Optionally included in an example is also a base (not shown), also referred to as a base portion, that may be attached to handle portion 305 opposite head portion 310, and is configured to stand on a surface and support housing 105/205 in a generally upright position. Barcode reader 300 can be used in a hands-free mode as a stationary workstation when it is placed on a countertop or other workstation surface. Barcode reader 300 can also be used in a handheld mode when it is picked up off the countertop or base station, and held in the user's hand. In the hands-free mode, products can be slid, swiped past, or presented to the window 110/210 for barcode reader 300 to initiate barcode reading operations. In the handheld mode, barcode reader 300 can be moved towards a barcode on a product, and trigger 315 can be manually depressed to initiate imaging of the barcode. Other implementations may provide only handheld or only hands-free configurations. In the example of FIG. 17, barcode reader 300 is ergonomically configured for a user's hand as a gun-shaped housing, though other configurations may be utilized as understood by those of ordinary skill in the art. As shown, handle portion 305 extends below and rearwardly away from head portion 310 along a centroidal axis obliquely angled relative to first central axis 125/225 of field-of-view 120/220 of imaging sensor 115/215 within head portion 310.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A barcode reader, comprising:
a housing and a window positioned in the housing;
an imaging sensor positioned within the housing;
an illumination source positioned within the housing; and
a transflective mirror positioned within the housing and in a path of an illumination pattern from the illumination source; wherein
the illumination pattern from the illumination source passes through the transflective mirror with the transflective mirror in a transmissive state; and
the illumination pattern from the illumination source is reflected off of the transflective mirror with the transflective mirror in a reflective state.

2. The barcode reader of claim 1, comprising a mirror positioned within the housing, wherein:
an imaging axis of the imaging sensor is aligned substantially parallel to an illumination axis of the illumination source;
the illumination pattern from the illumination source passes through the transflective mirror and out the window along a second central axis of the illumination pattern that is substantially parallel to a first central axis of a field-of-view of the imaging sensor with the transflective mirror in a transmissive state; and
the illumination pattern from the illumination source is reflected off of the transflective mirror towards the mirror and is reflected off of the mirror and out the window along a third central axis of the illumination pattern that is non-parallel to the first central axis of the field-of-view of the imaging sensor with the transflective mirror in a reflective state.

3. The barcode reader of claim 2, wherein the imaging sensor and the illumination source are both mounted to a common printed circuit board.

4. The barcode reader of claim 2, comprising a modifying optical component positioned between the mirror and the window.

5. The barcode reader of claim 4, wherein the modifying optical component includes one of a filter, an aperture, a polarizer, a diffractive optical element, a refractive optical element, or a collimator.

6. The barcode reader of claim 2, comprising an optical element positioned in a path of the illumination pattern from the illumination source and between one of the transflective mirror and the window, the transflective mirror and the mirror, or the mirror and the window.

7. The barcode reader of claim 1, comprising a mirror positioned within the housing, wherein:
an imaging axis of the imaging sensor is aligned substantially parallel to an illumination axis of the illumination source;
the illumination pattern from the illumination source passes through the transflective mirror and out the window along a second central axis of the illumination pattern that is substantially parallel to a first central axis of a field-of-view of the imaging sensor with the transflective mirror in a transmissive state; and
the illumination pattern from the illumination source is reflected off of the transflective mirror towards the mirror and is reflected off of the mirror and out the window along a third central axis of the illumination pattern that is parallel to the first central axis of the field-of-view of the imaging sensor with the transflective mirror in a reflective state.

8. The barcode reader of claim 7, wherein the imaging sensor and the illumination source are both mounted to a common printed circuit board.

9. The barcode reader of claim 7, comprising an optical element positioned in a path of the illumination pattern from the illumination source and between one of the transflective mirror and the window, the transflective mirror and the mirror, or the mirror and the window.

10. The barcode reader of claim 1, comprising a mirror positioned within the housing, wherein:
an imaging axis of the imaging sensor is aligned perpendicular to an illumination axis of the illumination source;
the illumination pattern from the illumination source passes through the transflective mirror and is reflected off of the mirror and out the window along a third central axis of the illumination pattern that is non-parallel to a first central axis of a field-of-view of the imaging sensor with the transflective mirror in a transmissive state; and
the illumination pattern from the illumination source is reflected off of the transflective mirror and out the window along a second central axis of the illumination pattern that is substantially parallel to the first central axis of the field-of-view of the imaging sensor with the transflective mirror in a reflective state.

11. The barcode reader of claim 10, comprising an optical element positioned in a path of the illumination pattern from the illumination source and between one of the transflective mirror and the window, the transflective mirror and the mirror, or the mirror and the window.

12. The barcode reader of claim 1, comprising a mirror positioned within the housing, wherein:
an imaging axis of the imaging sensor is aligned perpendicular to an illumination axis of the illumination source;
the illumination pattern from the illumination source passes through the transflective mirror and is reflected off of the mirror and out the window along a third central axis of the illumination pattern that is parallel to a first central axis of a field-of-view of the imaging sensor with the transflective mirror in a transmissive state; and
the illumination pattern from the illumination source is reflected off of the transflective mirror and out the window along a second central axis of the illumination pattern that is substantially parallel to the first central axis of the field-of-view of the imaging sensor with the transflective mirror in a reflective state.

13. The barcode reader of claim 12, comprising an optical element positioned in a path of the illumination pattern from the illumination source and between one of the transflective mirror and the window, the transflective mirror and the mirror, or the mirror and the window.

14. The barcode reader of claim 1, wherein the illumination pattern from the illumination source passes through the transflective mirror and is reflected off of the transflective mirror with the transflective mirror in a transflective state.

15. The barcode reader of claim 1, comprising a diffuser positioned within the housing, wherein:
an imaging axis of the imaging sensor is aligned parallel to an illumination axis of the illumination source;
the illumination pattern from the illumination source passes through the transflective mirror and out the window along a second central axis of the illumination pattern that is substantially parallel to a first central axis of a field-of-view of the imaging sensor with the transflective mirror in a transmissive state; and
the illumination pattern from the illumination source is reflected off of the transflective mirror towards the diffuser and through the diffuser and out the window with the transflective mirror in a reflective state.

16. The barcode reader of claim 15, wherein the imaging sensor and the illumination source are both mounted to a common printed circuit board.

17. The barcode reader of claim 15, wherein the diffuser changes a color of the illumination pattern.

18. The barcode reader of claim 15, comprising an optical element positioned in a path of the illumination pattern from the illumination source and between the transflective mirror and the window.

19. The barcode reader of claim 15, wherein the illumination pattern from the illumination source passes through the transflective mirror and is reflected off of the transflective mirror with the transflective mirror in a transflective state.

20. The barcode reader of claim 1, comprising a diffuser positioned within the housing, wherein:
an imaging axis of the imaging sensor is aligned perpendicular to an illumination axis of the illumination source;
the illumination pattern from the illumination source passes through the transflective mirror and through the diffuser and out the window with the transflective mirror in a transmissive state; and
the illumination pattern from the illumination source is reflected off of the transflective mirror and out the window along a second central axis of the illumination pattern that is substantially parallel to a first central axis of a field-of-view of the imaging sensor with the transflective mirror in a reflective state.

21. The barcode reader of claim 20, wherein the diffuser changes a color of the illumination pattern.

22. The barcode reader of claim 20, comprising an optical element positioned in a path of the illumination pattern from the illumination source and between the transflective mirror and the window.

23. The barcode reader of claim 20, wherein the illumination pattern from the illumination source passes through the transflective mirror and is reflected off of the transflective mirror with the transflective mirror in a transflective state.

* * * * *